United States Patent
Chai et al.

(10) Patent No.: US 10,566,668 B2
(45) Date of Patent: Feb. 18, 2020

(54) SODIUM ION-BASED INTERNAL HYBRID ELECTROCHEMICAL ENERGY STORAGE CELL

(71) Applicant: Nanotek Instruments, Inc., Dayton, OH (US)

(72) Inventors: Songhai Chai, Centerville, OH (US); Yen-Po Lin, Hsinchu (TW); Aruna Zhamu, Springboro, OH (US); Bor Z. Jang, Centerville, OH (US)

(73) Assignee: Nanotek Instruments Group, LLC, Dayton, OH (US)

(*) Notice: Subject to any disclaimer, the term of this patent is extended or adjusted under 35 U.S.C. 154(b) by 164 days.

(21) Appl. No.: 15/727,900

(22) Filed: Oct. 9, 2017

(65) Prior Publication Data

US 2019/0109358 A1    Apr. 11, 2019

(51) Int. Cl.
| | |
|---|---|
| *H01M 12/00* | (2006.01) |
| *H01M 4/583* | (2010.01) |
| *H01M 4/62* | (2006.01) |
| *H01M 4/36* | (2006.01) |

(52) U.S. Cl.
CPC ........ *H01M 12/005* (2013.01); *H01M 4/36* (2013.01); *H01M 4/583* (2013.01); *H01M 4/625* (2013.01); *H01M 2300/0002* (2013.01)

(58) Field of Classification Search
CPC .................... H01M 12/005; H01M 4/583
See application file for complete search history.

(56) References Cited

U.S. PATENT DOCUMENTS

| | | | |
|---|---|---|---|
| 7,759,008 B2 | 7/2010 | Barker et al. | |
| 9,564,656 B1 | 2/2017 | Zhamu et al. | |
| 2005/0238961 A1 | 10/2005 | Barker et al. | |
| 2012/0295096 A1* | 11/2012 | Liu | B82Y 30/00 428/312.8 |

(Continued)

FOREIGN PATENT DOCUMENTS

WO    2017095512 A1    6/2017

OTHER PUBLICATIONS

Adler et al., "A simplified synthesis for meso-tetraphenylporphine" J. Org. Chem. (1967) vol. 32, No. 2, p. 476.

(Continued)

*Primary Examiner* — Olatunji A Godo

(57) ABSTRACT

Provided is an internal hybrid electrochemical cell comprising: (a) a pseudocapacitance-like cathode comprising a cathode active material that contains both graphene sheets and a porphyrin compound, including porphyrin or a porphyrin complex, wherein the porphyrin compound is bonded to or supported by primary surfaces of graphene sheets to form a redox pair for pseudocapacitance; (b) a battery-like anode comprising an anode active material selected from sodium metal, a sodium metal alloy, a sodium intercalation compound, a sodium-containing compound, or a combination thereof, and (c) a sodium-containing electrolyte in physical contact with the anode and the cathode; wherein the cathode active material has a specific surface area no less than 100 $m^2/g$ which is in direct physical contact with the electrolyte.

31 Claims, 12 Drawing Sheets

(56) References Cited

U.S. PATENT DOCUMENTS

2013/0171502 A1  7/2013  Chen et al.
2014/0042390 A1* 2/2014  Gruner .................. H01M 4/364
                                              257/14

OTHER PUBLICATIONS

Athouel et al., "Variation of the MnO2 Bimessite Structure upon Charge/Discharge in an Electrochemical Supercapacitor Electrode in Aqueous Na2SO4 Electrolyte" Journal of Physical Chemistry (2008) vol. C 112, p. 7270-7277.

Falvo et al., "Microscale Synthesis and 1H NMR Analysis of Tetraphenylporphyrins" J. Chem. Educ. (1999) vol. 76, pp. 237-239.

Gao et al., "A Porphyrin Complex as a Self-Conditioned Electrode Material for High-Performance Energy Storage" Angewandte Chemie (2017) vol. 129, No. 35, pp. 10477-10482.

Karlicky et al., "Halogenated Graphenes: Rapidly Growing Family of Graphene Derivatives" ACS Nano (2013) vol. 7, No. 8, pp. 6434-6464.

Petit et al., "Microwave Irradiation in Dry Media: A New and Easy Method for Synthesis of Tetrapyrrolic Compounds" Synth. Commun. (1992) vol. 22, No. 8, pp. 1137-1142.

Qu et al., "A new cheap asymmetric aqueous supercapacitor: Activated carbon//NaMnO2" Journal of Power Sources (2009) vol. 194, p. 1222-1225.

Rothemund, "A New Porphyrin Synthesis" J. Am. Chem. Soc. (1936) vol. 58, No. 4, pp. 625-627.

Rothemund, "Formation of Porphyrins from Pyrrole and Aldehydes" J. Am. Chem. Soc. (1935) vol. 57, No. 10, pp. 2010-2011.

Shinokubo, Angew. Chem. (2013) vol. 125, p. 1400. doi: 10.1002/ange.201207020.

Whitacre et al., "Na4Mn9O18 as a positive electrode material for an aqueous electrolyte sodium-ion energy storage device" Electrochemistry Communications (2010) vol. 12, pp. 463-466.

Zhuo et al., "The preparation of NaV1-xCrxPO4F cathode materials for sodium-ion battery" Journal of Power Sources (2006) vol. 160, p. 698-703.

Jahan et al., "Electrocatalytically Active Graphene-Porphyrin MOF Composite for Oxygen Reduction Reaction" Journal of the American Chemical Society (2012) vol. 134, pp. 6707-6713.

PCT/US18/53728 International Search Report and Written Opinion dated May 1, 2019, 16 pages.

Yamuna et al., "Synthesis, characterization, and nonlinear optical properties of graphene oxide functionalizd with tetra-amino porphyrin" Journal of Nanoparticle Research (2013) vol. 15, pp. 1-9.

* cited by examiner meso positions* meso-substituted porphyrin beta positions (asterisks*)

beta-substituted porphyrin

Ph = phenol group

SODIUM ION-BASED INTERNAL HYBRID ELECTROCHEMICAL ENERGY STORAGE CELL

FIELD OF THE INVENTION

This invention relates generally to the field of electrochemical energy storage devices and, more particularly, to a fundamentally new internal hybrid battery/pseudocapacitor cell featuring a battery-like anode and a pseudocapacitor-like cathode.

BACKGROUND OF THE INVENTION

Supercapacitors (Ultra-capacitors or Electro-chemical Capacitors):

A supercapacitor normally depends on porous carbon electrodes to create a large surface area conducive to the formation of diffuse electric double layer (EDL) charges. The ionic species (cations and anions) in the EDL zones are formed in the electrolyte near an electrode surface when voltage is imposed upon a symmetric supercapacitor (or EDLC). The required ions for this EDL mechanism pre-exist in the liquid electrolyte (randomly distributed in the electrolyte) when the cell is made or in a discharged state.

When the supercapacitor is re-charged, the ions (both cations and anions) already pre-existing in the liquid electrolyte are formed into EDLs near their respective local electrodes. There is no exchange of ions between an anode active material and a cathode active material. The amount of charges that can be stored (capacitance) is dictated solely by the concentrations of cations and anions that pre-exist in the electrolyte. These concentrations are typically very low and are limited by the solubility of a salt in a solvent, resulting in a low energy density.

Since the formation of EDLs does not involve a chemical reaction or an exchange of ions between the two opposite electrodes, the charge or discharge process of an EDL supercapacitor can be very fast, typically in seconds, resulting in a very high power density (more typically 3,000-8,000 W/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Another type of supercapacitor is a pseudocapacitor that stores electrical energy by means of reversible faradaic redox reactions on the surface of suitable carbon electrodes. Such an electrode typically is composed of a carbon material (e.g. activated carbon) and a transition metal oxide (or a conjugate polymer), which together form a redox pair. Pseudocapacitance is typically accompanied with an electron charge-transfer between electrolyte and electrode arising from a de-solvated and adsorbed ion whereby only one electron per charge unit participates. This faradaic charge transfer originates from a very fast sequence of reversible redox, intercalation or electrosorption processes. The adsorbed ion has no chemical reaction with the atoms of the electrode (no chemical bonding) since only a charge-transfer occurs.

Despite the positive attributes of supercapacitors, there are several technological barriers to widespread implementation of supercapacitors for various industrial applications. For instance, EDLC supercapacitors possess very low energy densities when compared to batteries (e.g., 5-8 Wh/kg for commercial supercapacitors vs. 20-40 Wh/Kg for the lead acid battery and 50-100 Wh/kg for the NiMH battery). Although a pseudocapacitor can exhibit a higher specific capacitance or energy density relative to the EDLC, the energy density per cell is typically lower than 20 Wh/kg. The conventional pseudocapacitor also suffers from a poor cycle life. Lithium-ion batteries possess a much higher energy density, typically in the range of 150-220 Wh/kg, based on the total cell weight.

Lithium-ion Batteries (LIB):

Although possessing a much higher energy density, lithium-ion batteries deliver a very low power density (typically 100-500 W/Kg), requiring typically hours for recharge. Conventional lithium-ion batteries also pose some safety concern.

The low power density or long re-charge time of a lithium ion battery is due to the mechanism of shuttling lithium ions between the interior of an anode and the interior of a cathode. During recharge, lithium atoms must diffuse out of a cathode active material (e.g. particles of $LiCoO_2$), migrate through an electrolyte phase, and enters or intercalates into the bulk of an anode active material particles (e.g. graphite particles). Most of these lithium ions have to come all the way from the cathode side by diffusing out of the bulk of a cathode active particle, through the pores of a solid separator (pores being filled with a liquid electrolyte), and into the bulk of a graphite particle at the anode.

During discharge, lithium ions diffuse out of the anode active material (e.g. de-intercalate out of graphite particles 10 μm in diameter), migrate through the liquid electrolyte phase, and then diffuse into the bulk of complex cathode crystals (e.g. intercalate into particles lithium cobalt oxide, lithium iron phosphate, or other lithium insertion compound). Because the liquid electrolyte only reaches the external surface (not interior) of a solid particle (e.g. graphite particle), lithium ions swimming in the liquid electrolyte can only migrate (via fast liquid-state diffusion) to the surface of a graphite particle. To penetrate into the bulk of a solid graphite particle would require a slow solid-state diffusion (commonly referred to as "intercalation") of lithium ions. The diffusion coefficients of lithium in solid particles of lithium metal oxide are relatively low; e.g. typically $10^{-16}$-$10^{-8}$ $cm^2/sec$ (more typically $10^{-14}$-$10^{-10}$ $cm^2/sec$), although those of lithium in liquid are approximately $10^{-6}$ $cm^2/sec$.

As such, these intercalation or solid-state diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

Lithium Ion Capacitors (LIC):

A hybrid energy storage device that is developed for the purpose of combining some features of an EDL supercapacitor (or symmetric supercapacitor) and those of a lithium-ion battery (LIB) is a lithium-ion capacitor (LIC). A LIC contains a lithium intercalation compound (e.g., graphite particles) as an anode and an EDL capacitor-type cathode (e.g. activated carbon, AC). In a commonly used LIC, $LiPF_6$ is used as an electrolyte salt, which is dissolved in a solvent, such as propylene carbonate. When the LIC is in a charged state, lithium ions are retained in the interior of the lithium intercalation compound anode (i.e. micron-scaled graphite particles) and their counter-ions (e.g. negatively charged $PF_6^-$) are disposed near activated carbon surfaces.

When the LIC is discharged, lithium ions migrate out from the interior of graphite particles (a slow solid-state diffusion process) to enter the electrolyte phase and, concurrently, the counter-ions $PF_6^-$ are also released from the EDL zone, moving further away from AC surfaces into the bulk of the electrolyte. In other words, both the cations ($Li^+$ ions) and the anions ($PF_6^-$) are randomly disposed in the liquid electrolyte, not associated with any electrode. This implies that the amounts of both the cations and the anions that dictate the specific capacitance of a LIC are essentially limited by the solubility limit of the lithium salt in a solvent (i.e. limited by the amount of $LiPF_6$ that can be dissolved in the solvent) and the surface area of activated carbon in the cathode. Therefore, the energy density of LICs (a maximum of 14 Wh/kg) is not much higher than that (6 Wh/kg) of an EDLC (symmetric supercapacitor), and remains an order of magnitude lower than that (most typically 150-220 Wh/kg) of a LIB.

Furthermore, due to the need to undergo de-intercalation and intercalation at the anode, the power density of a LIC is not high (typically<12 kW/kg, which is comparable to or only slightly higher than those of an EDLC).

Sodium Ion Batteries and Sodium Compound-Based Supercapacitors

As a totally distinct class of energy storage device, sodium batteries have been considered an attractive alternative to lithium batteries since sodium is abundant and the production of sodium is significantly more environmentally benign compared to the production of lithium. In addition, the high cost of lithium is a major issue and Na batteries potentially can be of significantly lower cost.

There are at least two types of batteries that operate on bouncing sodium ions ($Na^+$) back and forth between an anode and a cathode: the sodium metal battery having Na metal or alloy as the anode active material and the sodium-ion battery having a Na intercalation compound as the anode active material. Sodium ion batteries using a hard carbon-based anode active material (a Na intercalation compound) and a sodium transition metal phosphate as a cathode have been described by several research groups: X. Zhuo, et al. Journal of Power Sources 160 (2006) 698; J. Barker, et al., US Patent Application US2005/0238961, 2005; J. Barker, et al. "Sodium Ion Batteries," U.S. Pat. No. 7,759,008 (Jul. 20, 2010) and J. F. Whitacre, et al. "$Na_4Mn_9O_{18}$ as a positive electrode material for an aqueous electrolyte sodium-ion energy storage device," Electrochemistry Communications 12 (2010) 463-466.

However, these sodium-based devices exhibit even lower specific energies and rate capabilities than Li-ion batteries. The anode active materials for Na intercalation and the cathode active materials for Na intercalation have lower Na storage capacities as compared with their Li storage capacities. For instance, hard carbon particles are capable of storing Li ions up to 300-360 mAh/g, but the same materials can store Na ions up to 150-250 mAh/g.

Instead of hard carbon or other carbonaceous intercalation compound, sodium metal may be used as the anode active material in a sodium metal cell. However, the use of metallic sodium as the anode active material is normally considered undesirable and dangerous due to the dendrite formation, interface aging, and electrolyte incompatibility problems.

Aqueous electrolyte-based asymmetric or hybrid supercapacitors with a sodium ion intercalation compound ($NaMnO_2$) as the cathode and activated carbon as the anode were investigated by Qu, et al [Q. T. Qu, Y. Shi, S. Tian, Y. H. Chen, Y. P. Wu, R. Holze, Journal of Power Sources, 194 (2009) 1222]. Similar compounds (sodium birnessite, $Na_x\text{-}MnO_2$) were used as the electrode materials of another supercapacitor [L. Athouel, F. Moser, R. Dugas, O. Crosnier, D. Belanger, T. Brousse, Journal of Physical Chemistry C 112 (2008) 7270]. At least the cathode in these supercapacitors involves solid state diffusion (intercalation and de-intercalation) of Na ions in a $Na_xMnO_2$ solid. Furthermore, they still exhibit relatively low energy densities.

However, these sodium-based devices exhibit even lower specific energies and rate capabilities than Li-ion batteries. These conventional sodium-ion batteries require sodium ions to diffuse in and out of a sodium intercalation compound at both the anode and the cathode. The required solid-state diffusion processes for sodium ions in a sodium-ion battery are even slower than the Li diffusion processes in a Li-ion battery, leading to excessively low power densities.

The above review of the prior art indicates that a battery has a higher energy density, but is incapable of delivering a high power (high currents or pulsed power) that an EV, HEV, or micro-EV needs for start-stop and accelerating. A battery alone is also not capable of capturing and storing the braking energy of a vehicle. A supercapacitor or LIC can deliver a higher power, but does not store much energy (the stored energy only lasts for a short duration of operating time) and, hence, cannot be a single power source alone to meet the energy/power needs of an EV or HEV. Thus, there is an urgent need for an electrochemical energy storage device that delivers both a high energy density and a high power density.

SUMMARY OF THE INVENTION

This invention provides a sodium ion-based internal hybrid electrochemical energy storage device that exhibits a power density significantly higher than the power densities of conventional supercapacitors and dramatically higher than those of conventional lithium ion or sodium ion batteries. This device exhibits an energy density comparable to or higher than those of batteries, and significantly higher than those of conventional supercapacitors.

In certain preferred embodiments, the invented internal hybrid electrochemical cell comprises: (A) a pseudocapacitance-like cathode comprising a cathode active material that contains both graphene sheets and a porphyrin compound (e.g., porphyrin, a porphyrin complex, a derivative of porphyrin, a functionalized porphyrin, etc.), wherein the porphyrin compound is bonded to or supported by primary surfaces of the graphene sheets to form a redox pair for pseudocapacitance; (B) a battery-like anode comprising an anode active material selected from sodium metal, a sodium metal alloy, a sodium intercalation compound, a sodium-containing compound, or a combination thereof, and (C) a sodium-containing electrolyte in physical contact with the anode and the cathode; wherein the cathode active material has a specific surface area no less than 100 m²/g which is in direct physical contact with said electrolyte. The cell is typically and preferably sealed in a protective casing (e.g. inside a pouch or steel cylindrical tube) to prevent exposure to air.

In certain preferred embodiments, the invented internal hybrid electrochemical cell comprises: (A) a pseudocapacitance-like cathode comprising a cathode active material that contains a porphyrin compound (e.g., porphyrin, a porphyrin complex, a derivative of porphyrin, a functionalized porphyrin, etc.), wherein the porphyrin compound is bonded to or supported by a conductive carbon material and the carbon material and the porphyrin compound form a redox pair for pseudocapacitance and the carbon material is selected from activated carbon, activated carbon black, expanded graphite flakes, exfoliated graphite worms, carbon nanotube, carbon nanofiber, carbon fiber, a combination thereof, or a combination thereof with graphene; (B) a battery-like anode comprising an anode active material selected from sodium metal, a sodium metal alloy, a sodium intercalation compound, a sodium-containing compound, or a combination thereof, and (C) a sodium-containing electrolyte in physical contact with the anode and the cathode; wherein the cathode active material has a specific surface area no less than 100 $m^2/g$ which is in direct physical contact with said electrolyte.

The activated carbon is selected from chemically etched or expanded soft carbon, chemically etched or expanded hard carbon, exfoliated activated carbon, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nanofiber, activated carbon fiber, activated graphite fiber, activated carbonized polymer fiber, activated coke, activated pitch, activated asphalt, activated mesophase carbon, activated mesoporous carbon, activated electrospun conductive nanofiber, or a combination thereof.

In some embodiments, the cathode further contains a conductive additive and the cathode forms a mesoporous structure having a pore size in the range from 2 nm to 50 nm.

The sodium intercalation compound is preferably selected from pre-sodiated coke (e.g. needle coke), pre-sodiated carbon black, pre-sodiated amorphous carbon, pre-sodiated activated carbon, pre-sodiated hard carbon, pre-sodiated soft carbon, pre-sodiated hollow carbon nanowires, pre-sodiated hollow carbon sphere, pre-sodiated carbon nanotubes, pre-sodiated carbon fibers, pre-sodiated expanded graphite, pre-sodiated graphene, sodium titanates, pre-sodiated $V_2O_5$, pre-sodiated $Nb_2O_5$, pre-sodiated $NiCo_2O_4$, $Na_3V_2(PO_4)_3$, $NaTi_2(PO_4)_3$, $Na_2Ti_3O_7$, $Na_2C_8H_4O_4$, $Na_2TP$, $Na_xTiO_2$ (x=0.2 to 1.0), $Na_2Fe_2(SO_4)_3$, $Na_2C_8H_4O_4$, carboxylate based materials, $C_8H_4Na_2O_4$, pre-sodiated $C_8H_6O_4$, $C_8H_5NaO_4$, $C_8Na_2F_4O_4$, $C_{10}H_2Na_4O_8$, pre-sodiated $C_{14}H_4O_6$, $C_{14}H_4Na_4O_8$, a pre-sodiated member of MXenes, or a combination thereof.

It may be noted that MXenes are chemically derived from layered hexagonal $M_{n+1}AX_n$ or MAX phases, where M is an early transition metal, A is a IIIA or IVA group element, and X is C and/or N. The basic unit is the interleaved M and A layers. M layers are near close-packed layers with X atoms filling the octahedral sites, while the A atoms are located at the center of trigonal prisms. The layer number of M varies when n changes from 1 to 3.

By definition, a pre-sodiated electrode material is a material that has been preloaded with sodium, pre-reacted with sodium, or pre-intercalated with sodium ions before this material is incorporated into an energy storage cell.

In certain embodiments, the porphyrin compound is selected from a porphyrin-transition metal compound. The porphyrin complex is preferably selected from porphyrin-copper, porphyrin-zinc, porphyrin-nickel, porphyrin-cobalt, porphyrin-manganese, porphyrin-iron, porphyrin-tin, porphyrin-cadmium, porphyrin-vanadium, polyporphyrin, a functionalized porphyrin compound, or a combination thereof.

The porphyrin compounds are a group of heterocyclic macrocycle organic compounds, composed of four modified pyrrole subunits interconnected at their α carbon atoms via methine bridges (═CH—). The parent porphyrin is porphin, and substituted porphines are called porphyrins. The porphyrin ring structure is aromatic, with a total of 26 electrons in the conjugated system.

The center of the porphyrin can be empty (FIG. 3(A)) or holds a metal ion (e.g. denoted as M in FIG. 3(D)). The porphyrin center can be "coordinated" with a wide array of transition metal elements. For instance, M can be V, Cr, Mn, Fe, Co, Ni, Cu, Zn, Sn, In, etc. Different functional groups can be attached to one or more sides of the porphyrin molecule.

The functional chemical group in porphyrin compound may be selected from OY, NHY, O═C—OY, P═C—NR'Y, O═C—SY, O═C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

In certain embodiments, porphyrin compound contains a functionalized porphyrin compound having at least a functional group attached to a porphyrin molecule, wherein the functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The porphyrin compound may contain a functionalized porphyrin compound having at least a functional group attached to a porphyrin molecule, wherein the functional group contains an azide or bi-radical compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

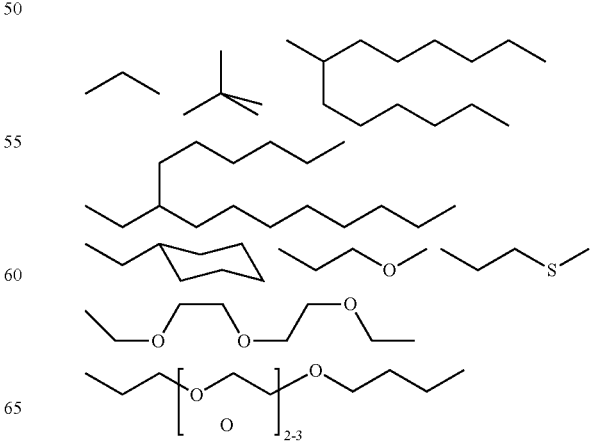

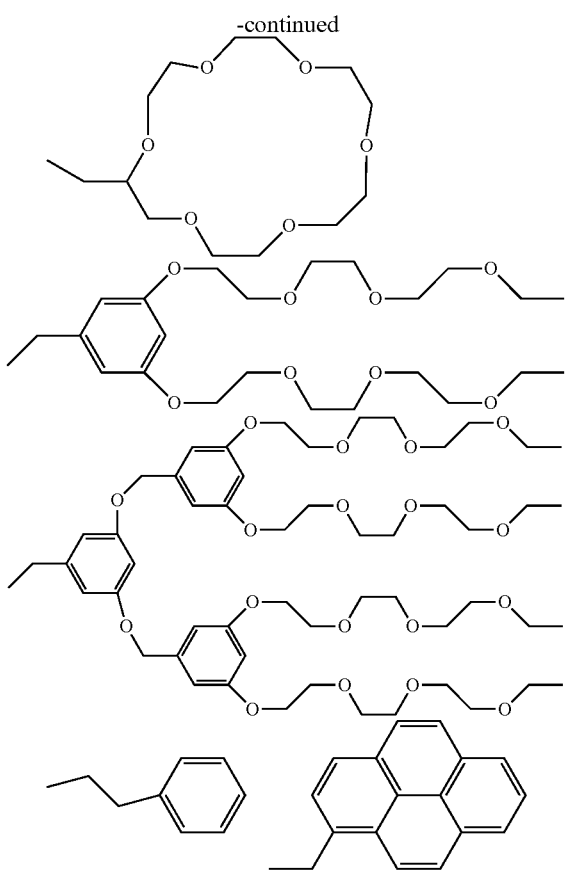

and combinations thereof.

The porphyrin compound is typically a planar molecule and the contact interface between a porphyrin compound and a graphene sheet is huge. Such a face-to-face or primary surface-to-primary surface contact enables fast and massive electron charge transfer between the two members (graphene and porphyrin compound) of a redox pair, leading to unexpectedly high pseudocapacitance.

In certain embodiments, the graphene sheets comprise single-layer or few-layer graphene, containing up to 10 graphene planes. By definition, a few-layer graphene sheet contains 2-10 planes of hexagonal carbon atoms ("graphene planes") stacked together via van der Waals forces. Graphene sheets may be selected from pristine graphene, graphene oxide, reduced graphene oxide, halogenated graphene, hydrogenated graphene, nitrogenated graphene, doped graphene, chemically functionalized graphene, or a combination thereof.

Although sodium metal (e.g. sodium foil, sodium particles, etc.) or sodium metal alloy (containing >80% by weight of Na element in the alloy) may be used as the anode active material, pre-sodiated particles of an anode active material commonly used in a sodium-ion battery (not sodium metal battery) is preferred. The sodium atoms reside in the interior of the pre-sodiated particles of the anode active material before the anode (along with a cathode, separator and electrolyte) is assembled into the electrochemical cell. Bare sodium metal is highly reactive with oxygen and moisture in the air, which may not be conducive to cell fabrication. Furthermore, sodium metal in an electrochemical cell tends to develop metal surface powdering, dead sodium particles (being separated from Na foil), and dendrite (hence, internal shorting). Surprisingly, the instant approach of pre-sodiating anode active material particles can effectively eliminate these issues.

The pre-sodiated graphite or carbon materials may be selected from particles of natural graphite, artificial graphite, soft carbon, hard carbon, coke (e.g. needle coke), carbon fibers, graphite fibers, carbon nanofibers, carbon nanotubes, carbon nano-horns, expanded graphite platelets, graphene sheets, etc. that have been pre-loaded with lithium, pre-reacted with lithium, and/or pre-intercalated with lithium.

Soft carbon and hard carbon are two special groups of carbon materials well-known in the art. They are not a matter of being "soft" or "hard." Instead, soft carbon refers to a carbon material having graphitic domains properly aligned to enable graphitization at a temperature higher than 2,500° C. Hard carbon refers to a carbon material having graphitic domains that are not conducive to graphitization at a temperature higher than 2,500° C.

In some embodiments, the cathode further contains a conductive additive and the cathode forms a mesoporous structure having a pore size in the range from 2 nm to 50 nm.

The cathode may further contain a resin binder that bonds graphene sheets together. In some embodiments, the cathode further contains a conductive filler selected from graphite or carbon particles, carbon black, expanded graphite, graphene, carbon nanotube, carbon nanofiber, carbon fiber, conductive polymer, or a combination thereof.

In certain embodiments, the internal hybrid electrochemical cell contains an anode current collector to support the anode material and/or a cathode current collector to support the cathode material. Preferably, at least one of the anode and the cathode contains a current collector that is a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerogel, graphene foam, graphene oxide foam, reduced graphene oxide foam, carbon fiber paper, graphene paper, graphene oxide paper, reduced graphene oxide paper, carbon nanofiber paper, carbon nanotube paper, or a combination thereof.

In certain preferred embodiments, the anode active material contains pre-sodiated particles of an anode active material and the pre-sodiated particles reside in pores of a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerogel, graphene foam, graphene oxide foam, reduced graphene oxide foam, carbon fiber paper, graphene paper, graphene oxide paper, reduced graphene oxide paper, carbon nanofiber paper, carbon nanotube paper, or a combination thereof.

The electrolyte in the internal hybrid electrochemical cell may be an organic liquid electrolyte, ionic liquid electrolyte, or gel electrolyte containing an amount of sodium ions when the cell is made. The electrolyte may be selected from an aqueous electrolyte, organic electrolyte, ionic liquid electrolyte, a mixture of an organic electrolyte and an ionic electrolyte, or a mixture thereof with a polymer.

In certain embodiments, the aqueous electrolyte contains a sodium salt dissolved in water or a mixture of water and alcohol. The sodium salt may be selected from $Na_2SO_4$, $Na_2Co_3$, NaOH, NaCl, NaF, NaBr, NaI, or a mixture thereof.

In some embodiments, the internal hybrid electrochemical cell contains an organic electrolyte comprising a liquid organic solvent selected from the group consisting of 1,3- dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

The organic electrolyte typically or preferably contains a sodium salt selected from sodium perchlorate ($NaClO_4$), sodium hexafluorophosphate ($NaPF_6$), sodium borofluoride ($NaBF_4$), sodium hexafluoroarsenide, sodium trifluorometasulfonate ($NaCF_3SO_3$), bis-trifluoromethyl sulfonylimide sodium ($NaN(CF_3SO_2)_2$), sodium trifluoromethanesulfonimide (NaTFSI), or a combination thereof.

The internal hybrid electrochemical cell may contain an ionic liquid electrolyte containing an ionic liquid solvent selected from a room temperature ionic liquid having a cation selected from tetra-alkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof. The ionic liquid solvent is preferably selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

The invention also provides an energy storage device comprising at least two presently invented internal hybrid electrochemical cells that are connected in series or in parallel.

The invention also provides an energy device comprising at least one internal hybrid electrochemical cell herein invented, which is electrically connected to an electrochemical cell (e.g. a battery, a supercapacitor, a fuel cell, etc.) in series or in parallel.

DESCRIPTION OF THE PREFERRED EMBODIMENTS

Figure 1:
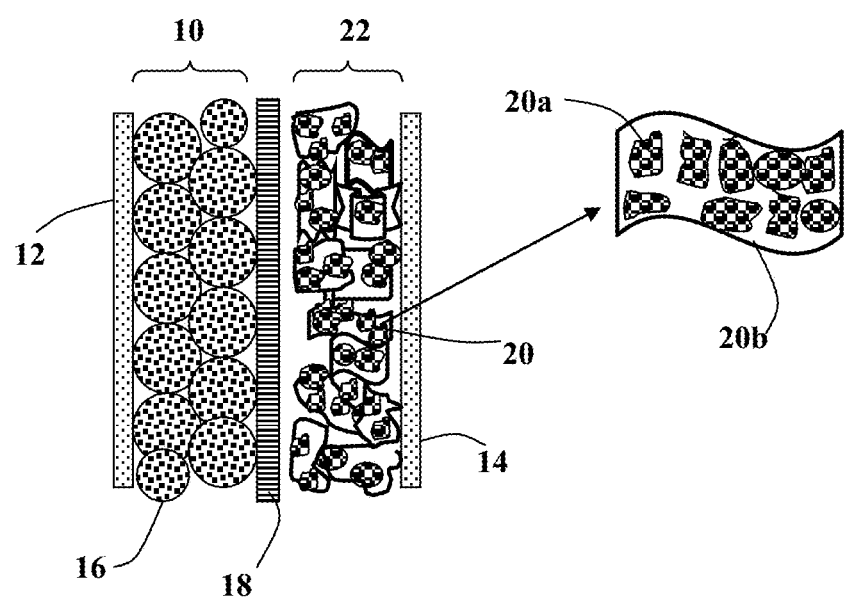
FIG. 1 Schematic of an internal hybrid electrochemical energy storage cell composed of a battery-like anode and a pseudocapacitor cathode, according to an embodiment of the present invention.

The present invention may be more readily understood by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides an internal hybrid electrochemical energy storage device that exhibits a power density significantly higher than the power densities of conventional supercapacitors and dramatically higher than those of conventional lithium ion or sodium ion batteries. This device exhibits an energy density comparable to or higher than those of batteries, and significantly higher than those of conventional supercapacitors.

In certain preferred embodiments, the invented internal hybrid electrochemical cell comprises: (A) a pseudocapacitance-like cathode comprising a cathode active material that contains both graphene sheets and a porphyrin compound (e.g., porphyrin, a porphyrin complex, a derivative or porphyrin, functionalized porphyrin, etc.) wherein the porphyrin compound is bonded to or supported by primary surfaces of the graphene sheets to form a redox pair for pseudocapacitance; (B) a battery-like anode comprising an anode active material selected from sodium metal, a sodium metal alloy, a sodium intercalation compound, a sodium-containing compound, or a combination thereof, and (C) a sodium-containing electrolyte in physical contact with the anode and the cathode; wherein the cathode active material has a specific surface area no less than 100 m$^2$/g which is in direct physical contact with the electrolyte. The cell is typically and preferably sealed in a protective casing (e.g. inside a pouch or steel cylindrical tube) to prevent exposure to air.

The porphyrin compound may be bonded to a carbon material (other than graphene) or a carbon material and graphene combined. In these cases, the invented internal hybrid electrochemical cell comprises: (A) a pseudocapacitance-like cathode comprising a cathode active material that contains a porphyrin compound, wherein the porphyrin compound is bonded to or supported by a conductive carbon material and the carbon material and the porphyrin compound form a redox pair for pseudocapacitance, and wherein the carbon material is selected from activated carbon, activated carbon black, expanded graphite flakes, exfoliated graphite worms, carbon nanotube, carbon nanofiber, carbon fiber, a combination thereof, or a combination thereof with graphene; (B) a battery-like anode comprising an anode active material selected from sodium metal, a sodium metal alloy, a sodium intercalation compound, a sodium-containing compound, or a combination thereof, and (C) a sodium-containing electrolyte in physical contact with the anode and the cathode; wherein the cathode active material has a specific surface area no less than 100 m$^2$/g which is in direct physical contact with the electrolyte.

The sodium intercalation compound is preferably selected from pre-sodiated coke, pre-sodiated carbon black, pre-sodiated amorphous carbon, pre-sodiated activated carbon, pre-sodiated hard carbon, pre-sodiated soft carbon, pre-sodiated hollow carbon nanowires, pre-sodiated hollow carbon sphere, pre-sodiated carbon nanotubes, pre-sodiated carbon fibers, pre-sodiated expanded graphite, pre-sodiated graphene, sodium titanates, pre-sodiated $V_2O_5$, pre-sodiated $Nb_2O_5$, pre-sodiated $NiCo_2O_4$, $Na_3V_2(PO_4)_3$, $NaTi_2(PO_4)_3$, $Na_2Ti_3O_7$, $Na_2C_8H_4O_4$, $Na_2TP$, $Na_xTiO_2$ (x=0.2 to 1.0), $Na_2Fe_2(SO_4)_3$, $Na_2C_8H_4O_4$, carboxylate based materials, $C_8H_4Na_2O_4$, pre-sodiated $C_8H_6O_4$, $C_8H_5NaO_4$, $C_8Na_2F_4O_4$, $C_{10}H_2Na_4O_8$, pre-sodiated $C_{14}H_4O_6$, $C_{14}H_4Na_4O_8$, a pre-sodiated member of MXenes, or a combination thereof.

It may be noted that MXenes are chemically derived from layered hexagonal $M_{n+1}AX_n$ or MAX phases, where M is an early transition metal (such as Sc, Ti, Zr, Hf, V, Nb, Ta, Cr, Mo and so on), A is a IIIA or IVA group element, and X is C and/or N. These include transition metal carbides, carbonitrides and nitrides. Some examples include $Ti_2CT_x$, $Ti_3C_2Tx$, and $Nb_4C_3Tx$. The basic unit is the interleaved M and A layers. M layers are near close-packed layers with X atoms filling the octahedral sites, while the A atoms are located at the center of trigonal prisms. The layer number of M varies when n changes from 1 to 3.

A pre-sodiated electrode material is a material that has been pre-loaded with sodium, pre-reacted with sodium, or pre-intercalated with sodium ions before this material is incorporated into an energy storage cell.

In certain embodiments, the sodium intercalation compound or sodium-containing compound is selected from the group consisting of: (a) Sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium-containing alloys or intermetallic compounds of Si, Ge, Sn, Pb, Sb, Bi, Zn, Al, Ti, Co, Ni, Mn, Cd, and their mixtures; (c) Sodium-containing oxides, carbides, nitrides, sulfides, phosphides, selenides, tellurides, or antimonides of Si, Ge, Sn, Pb, Sb, Bi, Zn, Al, V, Fe, Ti, Co, Ni, Mn, Cd, and mixtures or composites thereof; and (d) Combinations thereof and combinations thereof with a pre-sodiated carbon or graphite material.

As illustrated in FIG. 1 as an example, the internal hybrid electrochemical cell has an anode active material layer 10 bonded to an anode current collector 12 using a binder resin (not shown). The anode active material layer 10 is composed of multiple pre-sodiated particles 16 of an anode active material, optional conductive additive (not shown), and a resin binder (e.g. PVDF, SBR; not shown). There can be two anode active material layers bonded to the two primary surfaces of an anode current collector (e.g. a Cu foil).

The cell also has a cathode active material layer 22 bonded to a cathode current collector 14 using another binder resin (not shown). The cathode active material layer 22 is composed of multiple two-component nanosheets (e.g. 20) each containing substantially planar molecules of a porphyrin compound 20a bonded to a primary surface of a graphene sheet 20b. There can be two cathode active material layers bonded to two primary surfaces of a cathode current collector (e.g. Al foil). A porous separator 18 is disposed between the anode active material layer 10 and the cathode active material layer 22. Both the anode active material layer 10 and cathode active material layer 22 are impregnated with an electrolyte. The cell is then sealed in a protective housing.

As illustrated in FIGS. 3(A)-3(K), porphyrin compounds are a group of heterocyclic macrocycle organic compounds, composed of four modified pyrrole subunits interconnected at their α carbon atoms via methine bridges (═CH—). The parent porphyrin is porphin, and substituted porphines are called porphyrins. The porphyrin ring structure is aromatic, with a total of 26 electrons in the conjugated system.

Figure 3A:
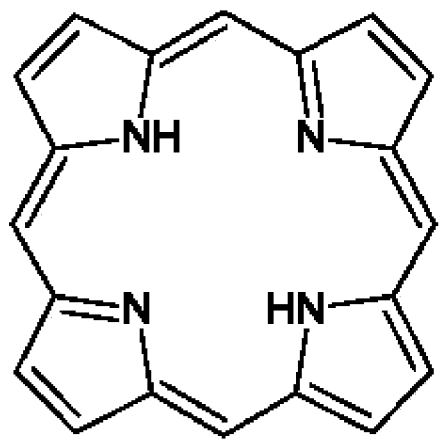
FIG. 3(A) Basic chemical formula of porphyrin.
Figure 3B:
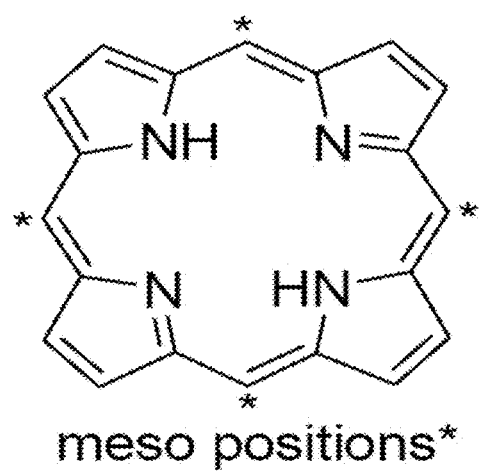
FIG. 3(B) shows the empty meso positions of a porphyrin molecule.
Figure 3C:
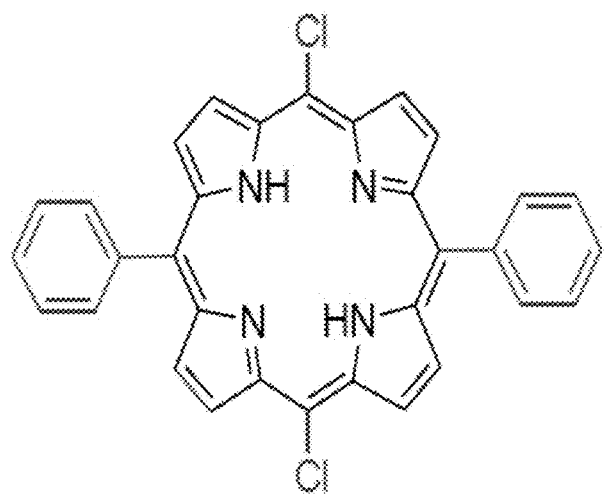
FIG. 3(C) shows the meso positions being attached with certain chemical or functional groups.
Figure 3D:
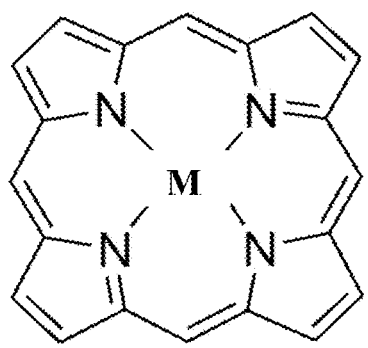
FIG. 3(D) The center of the porphyrin can hold a metal ion (e.g. denoted as M).
Figure 3E:
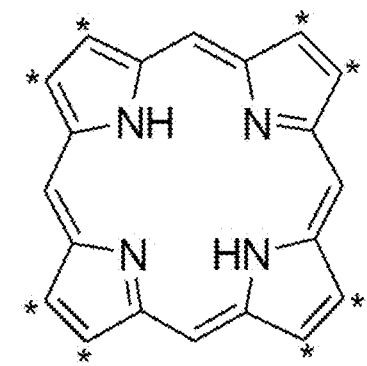
FIG. 3(E) shows the empty β (beta) positions of a porphyrin molecule.
Figure 3F:
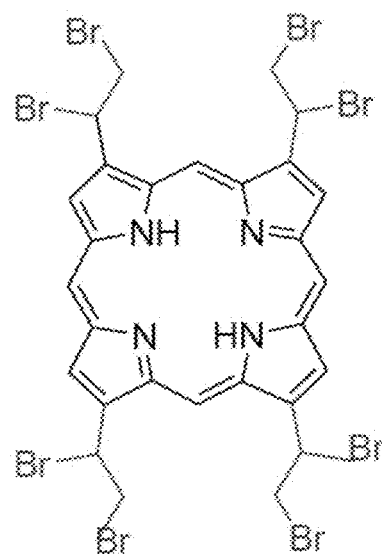
FIG. 3(F) shows some β positions being attached with some chemical groups.

The center of the porphyrin molecule can be empty (FIG. 3(A)) or hold a metal ion (e.g. denoted as M in FIG. 3(D)). This is commonly referred to as coordination. The porphyrin center can be "coordinated" with a wide array of transition metal elements. For instance, M can be V, Cr, Mn, Fe, Co, Ni, Cu, Zn, Sn, In, etc. Different functional groups can be attached to one or more sides of the porphyrin molecule. As an example, FIG. 3(B) shows the empty meso positions and FIG. 3(C) shows the meso positions being attached with certain chemical or functional groups. FIG. 3(E) shows the empty β (beta) positions and FIG. 3(F) shows some β positions being attached with some chemical groups. The center of the porphyrin can hold a metal and, in addition, some side positions are also attached with chemical groups. Examples are given in FIG. 3(G), FIG. 3(H), and FIG. 3(I). There can be many different combinations of many possible functional groups mixed and matched at these side and center locations to form different porphyrin complex compounds. Thus, the group of porphyrin and porphyrin complex compounds provides us with a broad array of potential electrode materials.

Preparation of porphyrin compounds can be accomplished in two broad categories of methods: biosynthesis and chemical synthesis. These are relatively well-known. For instance, biosynthesis can be used to produce HEME B (FIG. 3(I)).

One of the most common chemical synthesis methods for porphyrins is based on the work by Paul Rothemund [P. Rothemund, "Formation of Porphyrins from Pyrrole and Aldehydes," J. Am. Chem. Soc. (1935) 57 (10): 2010-2011; P. Rothemund, "A New Porphyrin Synthesis," J. Am. Chem. Soc. (1936) 58 (4): 625-627]. These basic techniques have been commonly practiced in modern chemistry field [e.g. A. D. Adler, et al. "A simplified synthesis for meso-tetraphenylporphine," J. Org. Chem. (1967) 32 (2): 476-476; Falvo, RaeAnne E.; Mink, Larry M.; Marsh, Diane F. "Microscale Synthesis and $^1$H NMR Analysis of Tetraphenylporphyrins," J. Chem. Educ. 1999 (76): 237-239].

Figure 3G:
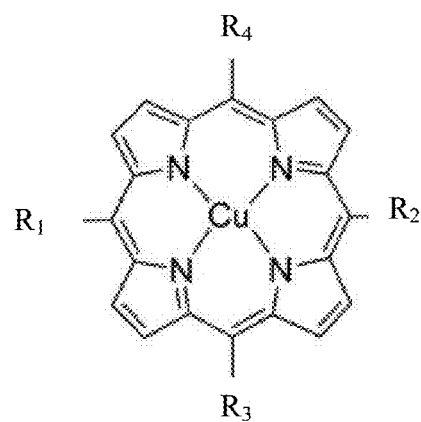
FIG. 3(G) The center of the porphyrin holds a metal (Cu) and, in addition, some side positions are also attached with chemical groups.
Figure 3H:
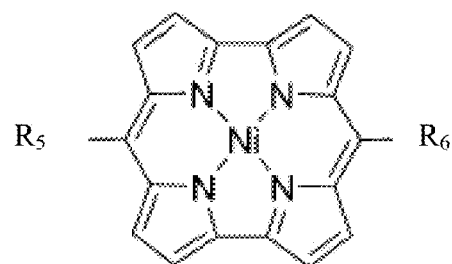
FIG. 3(H) The center of the porphyrin holds a metal (Ni) and some side positions are also attached with chemical groups.
Figure 3I:
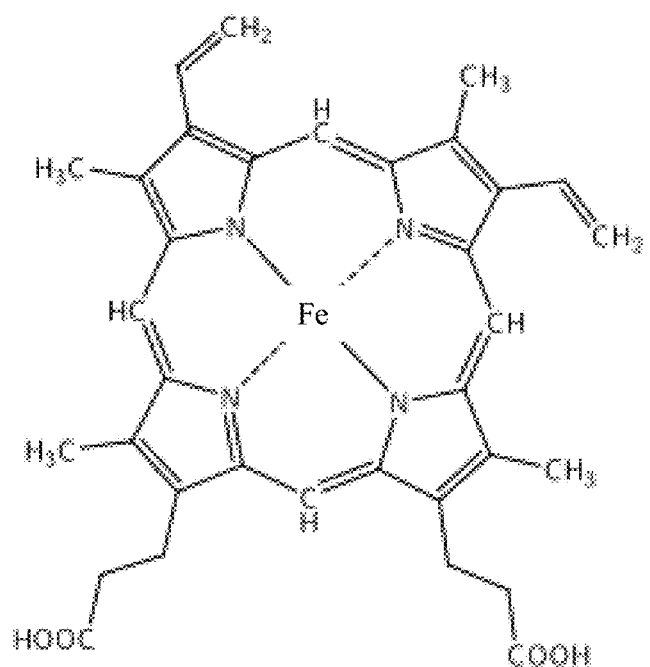
FIG. 3(I) The center of the porphyrin holds a metal (Fe) and some side positions are also attached with chemical groups.
Figure 3J:
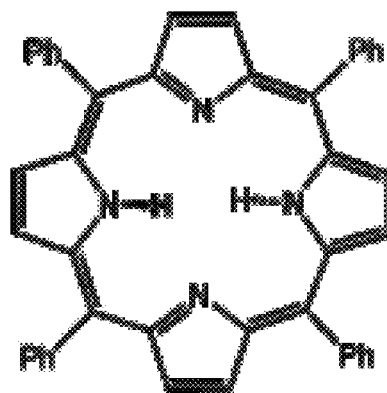
FIG. 3(J) Another example of a chemically functionalized Lewis structure for meso-teraphenyl porphyrin—a Lewis structure for meso-tetraphenyl porphyrin.
Figure 3K:
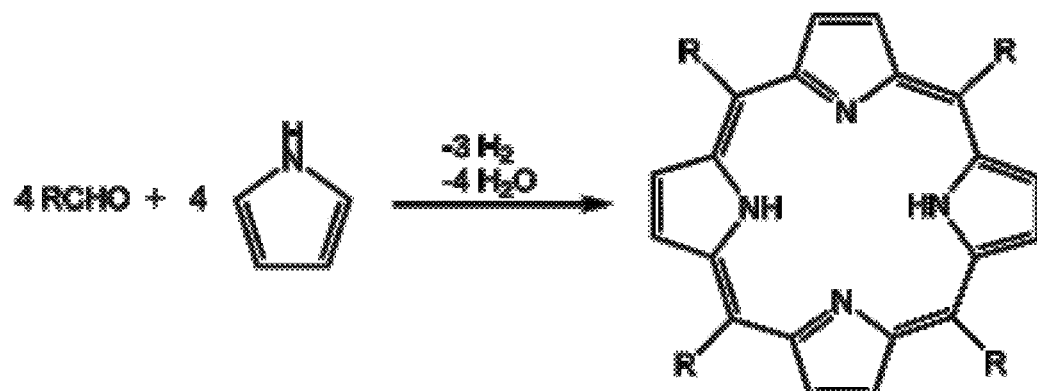
FIG. 3(K) An example of a chemical synthesis route for porphyrin.

The Rothemund approach is based on a condensation and oxidation, starting with pyrrole and an aldehyde (FIG. 3(K)). In solution-phase synthesis, acidic conditions are essential; formic acid, acetic acid, and propionic acid are typical reaction solvents. Alternatively, p-toluenesulfonic acid or various Lewis acids can be used with a non-acidic solvent. A large amount of side-product is formed and is removed, usually by recrystallization or chromatography. More environmentally green variants of the approach have been developed in which the reaction is performed with microwave irradiation using reactants adsorbed on acidic silica gel or at high temperature in the gas phase. In these cases, no additional acid is required [e.g. Petit, A.; Loupy, A.; Maiuard, P.; Momenteau, M., "Microwave Irradiation in Dry Media: A New and Easy Method for Synthesis of Tetrapyrrolic Compounds," Synth. Commun. 1992, 22 (8): 1137-114]).

The functional chemical group (e.g. $R_1$, $R_2$, $R_3$, $R_4$, $R_5$, or $R_6$ in FIG. 3(G) and FIG. 3(H)) in a porphyrin compound may be selected from OY, NHY, =C—OY, P=C—NR'Y, =C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from, a phenol group, R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

In certain embodiments, porphyrin compound contains a functionalized porphyrin compound having at least a functional group attached to a porphyrin molecule, wherein the functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The porphyrin compound may contain a functionalized porphyrin compound having at least a functional group attached to a porphyrin molecule, wherein the functional group contains an azide or bi-radical compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

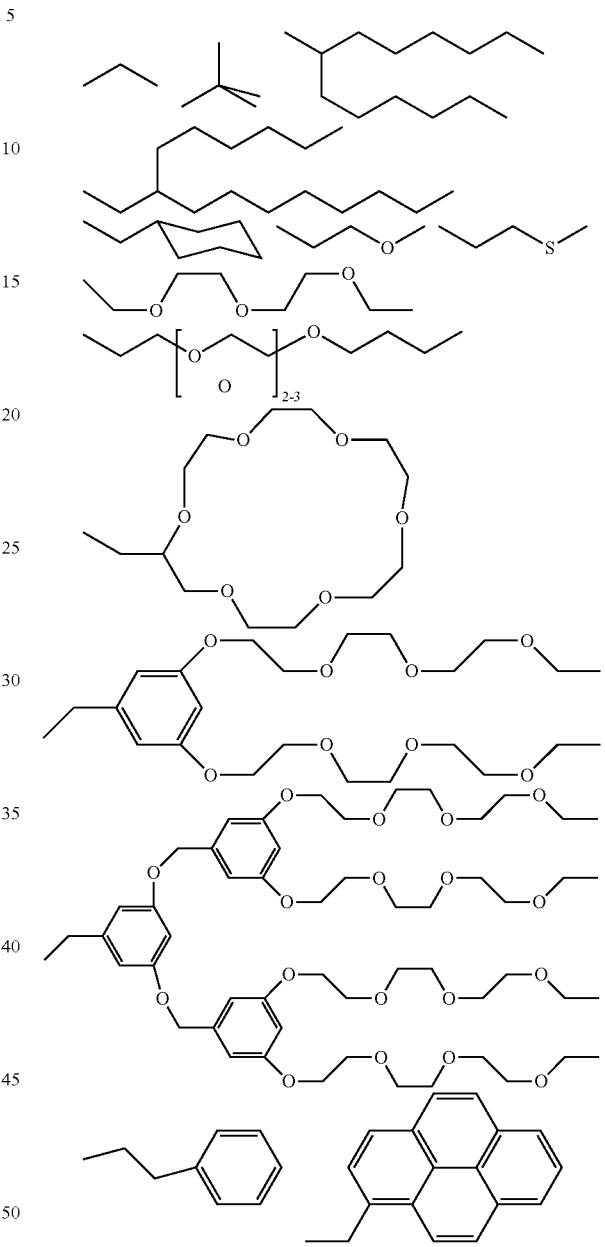

and combinations thereof.

In the invented cell, the cathode may comprise a cathode active material that contains a conductive carbon material and a porphyrin compound (e.g. porphyrin, a porphyrin complex, a chemical derivative of porphyrin, a chemically functionalized porphyrin, etc.) wherein the porphyrin compound is bonded to or supported by the carbon material and the porphyrin compound and the carbon material together form a redox pair for pseudocapacitance.

Preferably, the carbon material is selected from activated carbon, activated carbon black, expanded graphite flakes, exfoliated graphite worms, carbon nanotube, carbon nanofiber, carbon fiber, a combination thereof, or a combination thereof with graphene. The porphyrin compound and the carbon material, when intimately contacted together, form a redox pair capable of providing large amounts of pseudo-capacitance. Preferably, the conductive carbon material forms a mesoporous structure having meso-scaled pores of 2-50 nm and a specific surface area from greater than 100 $m^2/g$ to 3,200 $m^2/g$ (more preferably >500 $m^2/g$, further more preferably >1,000 $m^2/g$, and most preferably >1,500 $m^2/g$).

Preferably, the activated carbon in the cathode structure is selected from chemically etched or expanded soft carbon, chemically etched or expanded hard carbon, exfoliated activated carbon, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube (CNT) having an inter-planar separation no less than 0.4 nm, chemically expanded carbon nanofiber (CNF) having an inter-planar separation no less than 0.4 nm, activated carbon fiber, activated graphite fiber, activated carbonized polymer fiber, activated coke, activated pitch, activated asphalt, activated mesophase carbon, activated mesoporous carbon, activated electrospun conductive nanofiber, or a combination thereof. The expanded spacing in the chemically treated/expanded CNTs or CNFs is preferably >0.5 nm, more preferably >0.6 nm, and most preferably >0.8 nm.

These porous and electrically conductive materials are capable of accommodating a porphyrin compound in their pores (bonded to pore wall surfaces as a coating) and, in many cases, capable of protecting the porphyrin compound coating from getting dissolved in a liquid electrolyte, in addition to providing a 3-D network of electron-conducting paths. Quite significantly, the porphyrin compound and the carbon material (at the pore wall surfaces near a liquid electrolyte) form a redox pair that give rise to large amounts of pseudocapacitance.

Conductive carbon nanofiber mats having mesoporous pores can be readily produced by electro-spinning of a polymer, which can be carbonized to obtain carbon nanofibers. Also useful are carbon foam, carbon aerogel, and carbon xerogel. These foams may be reinforced with a binder resin, conductive polymer, or CNTs to make a porous structure of good structural integrity.

In one preferred embodiment, highly porous graphitic or carbonaceous materials may be used to make a conductive and protective backbone porous structure prior to impregnating the resulting porous structure with a porphyrin compound. In this approach, particles of these materials may be bonded by a binder to form a porous structure of good structural integrity.

The carbonaceous or graphitic material may be selected from chemically treated graphite with an inter-graphene planar separation no less than 0.4 nm (preferably greater than 0.5 nm, more preferably greater than 0.6 nm) which is not exfoliated, soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nanotube, chemically expanded carbon fiber or nanofiber, or a combination thereof. These carbonaceous or graphitic materials have one thing in common; they all have meso-scaled pores, enabling entry of electrolyte to access their interior planes.

In one preferred embodiment, the mesoporous carbonaceous material may be produced by using the following recommended procedures:

(A) dispersing or immersing a graphitic or carbonaceous material (e.g., powder of mesophase carbon, mesocarbon micro bead (MCMB), soft carbon, hard carbon, coke, polymeric carbon (carbonized resin), activated carbon (AC), carbon black (CB), multi-walled carbon nanotube (MWCNT), carbon nanofiber (CNF), carbon or graphite fiber, mesophase pitch fiber, and the like) in a mixture of an intercalant and/or an oxidant (e.g., concentrated sulfuric acid and nitric acid) and/or a fluorinating agent to obtain a carbon intercalation compound (CIC), graphite fluoride (GF), or chemically etched/treated carbon material; and optionally (B) exposing the resulting CIC, GF, or chemically etched/treated carbon material to a thermal treatment, preferably in a temperature range of 150-600° C. for a short period of time (typically 15 to 60 seconds) to obtain expanded carbon.

Alternatively, after step (A) above, the resulting CIC, GF, or chemically etched/treated carbon material is subjected to repeated rinsing/washing to remove excess chemical. The rinsed products are then subjected to a drying procedure to remove water. The dried CIC, GF, chemically treated CB, chemically treated AC, chemically treated MWCNT, chemically treated CNF, chemically treated carbon/graphite/pitch fiber can be used as a cathode active material (to pair up with a porphyrin compound) of the presently invented high-capacity cell. These chemically treated carbonaceous or graphitic materials can be further subjected to a heat treatment at a temperature preferably in the range of 150-600° C. for the purposes of creating meso-scaled pores (2-50 nm) to enable the interior structure being accessed by electrolyte. It may be noted that these interior graphene planes remain stacked and interconnected with one another, but the above-described chemical/thermal treatments facilitate direct access of these interior graphene planes by the electrolyte.

The broad array of carbonaceous materials, such as a soft carbon, hard carbon, polymeric carbon (or carbonized resin), mesophase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

In contrast, hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc.). These materials per se (without chemical/thermal treatments as described above) are not good candidate cathode materials for the presently invented high-capacity Li-ion cells. Hence, preferably, they are subjected to further chemical etching or chemical/thermal exfoliation to form a mesoporous structure having a pore size in the range of 2-50 nm (preferably 2-10 nm). These meso-scaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon mesoporous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as mesophase. This mesophase material can be extracted out of the liquid component of the mixture to produce isolated mesophase particles or spheres, which can be further carbonized and graphitized.

In general, the cathode active material (including the porous backbone structure and the porphyrin compound bonded to pore wall surfaces) as a whole also preferably form a mesoporous structure with a desired amount of meso-scaled pores (2-50 nm, preferably 2-10 nm) to allow for entry of electrolyte. These surface areas of the cathode active material as a whole are typically and preferably >100 $m^2/g$, more preferably >500 $m^2/g$, further more preferably >1,000 $m^2/g$, and most preferably >1,500 $m^2/g$.

A graphene sheet or nano graphene platelet (NGP) is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm, more preferably <3 nm (or <10 layers), and most preferably single layer graphene. The presently invented graphene-bonded porphyrin material preferably contains mostly single-layer graphene, but could make use of some few-layer graphene (less than 10 layers). The graphene sheet may contain a small amount (typically <25% by weight) of non-carbon elements, such as hydrogen, nitrogen, fluorine, and oxygen, which are attached to an edge or surface of the graphene plane.

Figure 2:
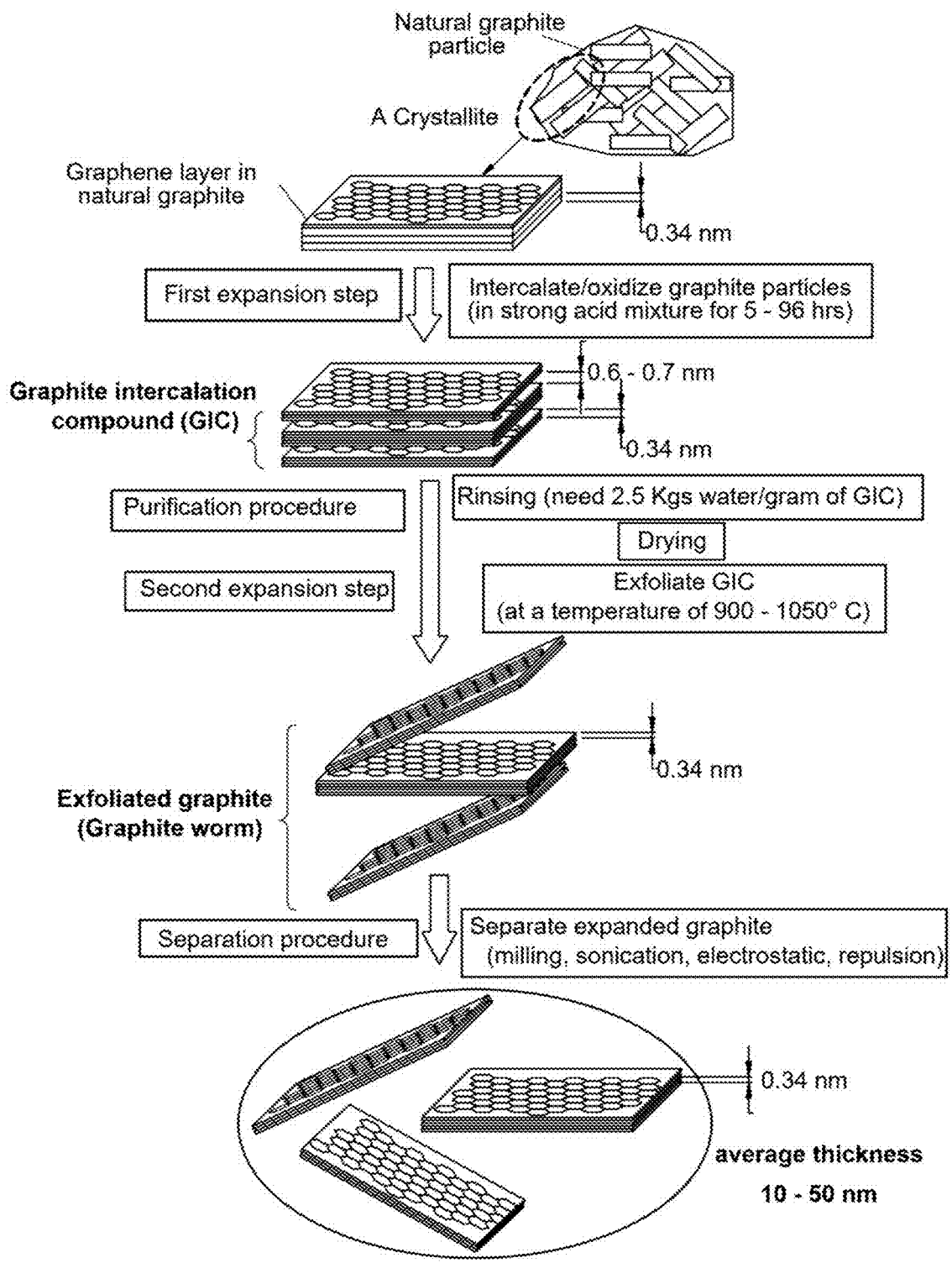
FIG. 2 Schematic of a process for producing graphene sheets.

Graphene sheets (herein also referred to as nano graphene platelets, NGPs) may be produced by using several processes, discussed below:

Referring to FIG. 2, graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days) to obtain graphite intercalation compound (GIC) or graphite oxide. If the graphite intercalation time is from 0.5 to 5 hours, the GIC tends to be incompletely intercalated (predominately non-Stage-1 GIC). The GIC particles may then be exposed to a thermal shock, preferably in a temperature range of 600-1,100° C. for typically 15 to 60 seconds to obtain exfoliated graphite or graphite worms.

The exfoliated graphite worms from thermal exfoliation of incompletely intercalated GIC may be subjected to mechanical shearing (e.g. using a mechanical shearing machine or an ultrasonicator) to break up the graphite flakes that constitute a graphite worm. The resulting graphite flakes, typically having a thickness higher than 100 nm, are commonly referred to as "expanded graphite" or "expanded graphite flakes."

If the GICs are mostly Stage-1 species or heavily oxidized graphite, thermal exfoliation of these GICs/graphite oxide can directly result in the formation of separated graphene sheets (1-10 graphene planes). The unbroken graphite worms or individual graphite flakes may be dispersed in water, acid, or organic solvent and ultrasonicated to obtain isolated graphene sheets.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nanoscaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets were, in most cases, natural graphite. However, the starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

The presently invented process typically resulted in nano graphene sheets that, when formed into a thin film with a thickness no greater than 100 nm, exhibits an electrical conductivity of at least 10 S/cm, often higher than 100 S/cm, and, in many cases, higher than 1,000 S/cm. The resulting NGP powder material typically has a specific surface area from approximately 300 $m^2/g$ to 2,600 $m^2/g$ and, in many cases, comprises single-layer graphene or few-layer graphene sheets.

When these graphene sheets are combined with a porphyrin compound to form graphene-porphyrin compound hybrid sheets, these hybrid 2D structures (when packed into a dry electrode) exhibit an electrical conductivity typically no less than $10^{-2}$ S/cm (typically and preferably greater than 1 S/cm and most typically and preferably greater than 100 S/cm; some being greater than 2,000 S/cm). The graphene component is typically in an amount of from 0.5% to 99% by weight (preferably from 1% to 90% by weight and more preferably between 5% and 80%) based on the total weight of graphene and the porphyrin compound combined.

Graphene sheets may be oxidized to various extents during their preparation, resulting in graphite oxide or graphene oxide (GO). Hence, in the present context, graphene preferably or primarily refers to those graphene sheets containing no or low oxygen content; but, they can include GO of various oxygen contents. Further, graphene may be fluorinated to a controlled extent to obtain graphene fluoride.

The NGPs may be obtained from exfoliation and platelet separation of a natural graphite, synthetic graphite, highly oriented pyrolytic graphite, graphite fiber, carbon fiber, carbon nanofiber, graphitic nanofiber, spherical graphite or graphite globule, mesophase micro-bead, mesophase pitch, graphitic coke, or graphitized polymeric carbon.

For instance, as discussed earlier, the graphene oxide may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

Surprisingly, the porphyrin compounds, when bonded to graphene sheet surfaces in a face-to-face manner and when the specific surface area of the resulting cathode exceeds 100 $m^2/g$ (preferably >500 $m^2/g$), exhibit a specific capacity significantly higher than those of conventional pseudocapacitor electrode.

A conductive additive is generally not needed since graphene sheets are conducting even though the porphyrin compound are generally not electrically conducting. However, one may choose to add a conductive additive and/or a binder material (e.g. binder resin or carbonized resin) to form an electrode of structural integrity. The conductive additive or filler may be selected from any electrically conductive material, but is advantageously selected from graphite or carbon particles, carbon black, expanded graphite, graphene, carbon nanotube, carbon nanofiber, carbon fiber, conductive polymer, or a combination thereof. The amount of conductive fillers is preferably no greater than 30% by weight based on the total cathode electrode weight (without counting the cathode current collector weight), preferably no greater than 15% by weight, and most preferably no greater than 10% by weight. The amount of binder material is preferably no greater than 15% by weight, more preferably no greater than 10%, and most preferably no greater than 5% by weight. It is important to note that the porphyrin-bonded graphene sheets, with or without the conductive filler and binder, must form an electrode having a specific surface area greater than 100 $m^2/g$ (preferably >500 $m^2/g$).

Preferred electrolyte types include organic liquid electrolyte, gel electrolyte, and ionic liquid electrolyte (preferably containing lithium salts dissolved therein), or a combination thereof, although one may choose to use aqueous or solid electrolytes.

Prior to pre-sodiation, particles of the anode active material may be coated with a carbonizable coating material (e.g., phenolic resin, poly(furfuryl alcohol), coal tar pitch, or petroleum pitch). The coating can then be carbonized to produce an amorphous carbon or polymeric carbon coating on the surface of these anode particles. This thin layer of carbon has a thickness preferably less than 1 µm prior to being subjected to a pre-sodiation treatment. The thin layer of carbon preferably has a thickness less than 100 nm. Such a thin layer of carbon may be obtained from pyrolization of a polymer, pitch, or organic precursor or obtained by chemical vapor deposition, physical vapor deposition, sputtering, etc.

Alternatively, the particles of an anode active material may be coated with a layer of graphene, electron-conducting polymer, or ion-conducting polymer. Such coating processes are well-known in the art.

Pre-sodiation can be accomplished in several different ways that can be classified into 3 categories: physical methods, electrochemical methods, and chemical methods. These methods are similar to the prelithiation methods, which are well-known in the art. Among these, the electrochemical intercalation is the most effective. As an example, a compacted mass of anode active material particles and an optional conductive additive can be contained in a conductive material cage. The cage (as an anode electrode) and a sodium rod (as a cathode) are then immersed in a sodium salt-solvent solution inside an electrochemical reactor. By imposing a current between the anode and the cathode, typically at a current density being from 0.5 mA/mg to 100 mA/mg, one can electrochemically intercalate sodium ions into the anode active material particles (e.g. $V_2O_5$ or $Nb_2O_5$) to produce pre-sodiated particles (e.g. pre-sodiated $V_2O_5$ or pre-sodiated $Nb_2O_5$).

In the pre-sodiated particles, the sodium atoms reside in the interior of the anode active material particles before the anode, a cathode, a separator and electrolyte are assembled to become an electrochemical cell. Bare sodium metal is highly reactive with oxygen and moisture in the air, which is not conducive to cell fabrication. Pre-sodiation of anode active material particles eliminates this shortcoming. Furthermore, sodium metal in an electrochemical cell tends to develop metal surface powdering, dead sodium particles (being separated from Na foil), and dendrite (hence, internal shorting). Surprisingly, the instant strategy of using pre-sodiated anode active material particles effectively eliminates these issues.

The particles of the anode active material may be in the form of a nanoparticle, nanowire, nanofiber, nanotube, nanosheet, nanoplatelet, nanodisc, nanobelt, nanoribbon, or nanohorn.

In a prior art lithium-ion capacitor (LIC) or sodium-ion capacitor (NIC), the primary cathode active material is a carbon material (e.g., activated carbon or CNT bundles), and hard carbon particles constitute the anode. In many cases, a sacrificial sodium metal foil is implemented into the NIC cell. This sodium metal layer is then partially or entirely ionized and dissolved during the first discharge cycle of the cell. The carbon material in a conventional LIC/NIC cathode provides electric double layers of charges. In contrast, the cathode of instant internal hybrid cell is based on graphene-porphyrin compound redox pairs that produce pseudocapacitance. Additionally, the anode active material is a pre-sodiated anode active material. Preferably, there is no sodium layer (Na metal foil or Na metal particles, for instance) that is added into the presently invented internal hybrid cell; instead, just pre-sodiated particles of an anode active material. Such a strategy obviates the need to handle sodium metal during cell manufacturing, which is challenging and expensive; cell production must be conducted in a battery-grade dry room.

A wide range of electrolytes can be used for practicing the instant invention. Most preferred are non-aqueous organic and/or ionic liquid electrolytes. The non-aqueous electrolyte to be employed herein may be produced by dissolving an electrolytic salt in a non-aqueous solvent. Any known non-aqueous solvent which has been employed as a solvent for a sodium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with sodium ion, so that the reduction reaction of the second solvent with the carbonaceous material well developed in graphitization is assumed to be suppressed. Further, when the donor number of the second solvent is controlled to not more than 18, the oxidative decomposition potential to the sodium electrode can be easily increased to 4 V or more, so that it is possible to manufacture an energy storage cell of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (gamma-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30% to 80%. By selecting the volume ratio of MEC from the range of 30% to 80%, more preferably 40% to 70%, the conductivity of the solvent can be improved. The electrolytic salts to be incorporated into a non-aqueous electrolyte may be selected from sodium salt selected from sodium perchlorate ($NaClO_4$), sodium hexafluorophosphate ($NaPF_6$), sodium borofluoride ($NaBF_4$), sodium hexafluoroarsenide, sodium trifluoro-metasulfonate ($NaCF_3SO_3$), bis-trifluoromethyl sulfonylimide sodium ($NaN(CF_3SO_2)_2$), sodium trifluoromethanesulfonimide (NaTFSI), or a combination thereof. The content of aforementioned electrolytic salts in the non-aqueous solvent is preferably 0.5 to 2.0 mol/l.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

The following examples serve to illustrate the preferred embodiments of the present invention and should not be construed as limiting the scope of the invention:

Example 1: Preparation of Isolated Graphene Oxide Sheets and Internal Hybrid Cells Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 12 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. The GO sheets were thermally reduced at 200° C. for 24 hours to obtain reduced graphene oxide (RGO) sheets.

A functionalized porphyrin, [5,15-bis-(ethynyl)-10,20-diphenylporphinato]copper(II) (CuDEPP), was synthesized according to Gao, et al. [Ping Gao, et al. "A Porphyrin Complex as a Self-Conditioned Electrode Material for High-Performance Energy Storage," Angewandte Chemie, Vol. 129, Issue 35, Aug. 21, 2017, Pages 10477-10482; Supporting Information]. However, the instant procedure has a major deviation from Gao's in that RGO sheets were added into the THF solution during the final phase of CuDEPP preparation. Specifically, [5,15-Bis(trimethylsilylethynl)-10,20-dipheny)porphinato]copper(II) (0.322 g, 0.45 mmol) was dissolved in THF (50 mL) under an argon atmosphere at 0° C. Then tetrabutylammonium fluoride (0.252 g, 0.8 mmol) and a desired amount of RGO were added; the RGO amount depending on the final weight ratio between RGO and CuDEPP. After 40 min, the reaction mixture was poured into 50 mL MeOH. The precipitate was filtered and washed by 100 mL MeOH. The product was collected to yield a dark purple solid, CuDEPP supported on graphene sheet surfaces.

For the synthesis of the carbon coated and graphene supported $Nb_2O_5$ nanocomposites, a microemulsion consisting of Igepal CO-520 (11.5 g), cyclohexane (225 mL), $75 \times 10^{-3}$ M HCl aqueous solution (1.25 mL), and anhydrous ethanol (3 mL) was prepared with appropriate stirring at room temperature. Subsequently, niobium ethoxide (0.375 mL) was introduced into the prepared microemulsion with constant stirring. After 30 min, the as-prepared $NbO_x$ nanoparticles ($NbO_x$ NPs) were collected by centrifuging (6000 rpm, 20 min) using a mixed solution of 1:1 (v/v) ether/n-hexane 3 times. The as-prepared $NbO_x$ NPs collected from the centrifuging step were dissolved in distilled water (100 mL). Subsequently, the aqueous solution with the as-prepared $NbO_x$ NPs was mixed with a pH-controlled GO solution. Herein, the pH-controlled GO solutions, composed of various amounts of GO powder (0.199, 0.465, and 1.794 g, for $Nb_2O_5$—C/rGO-70, -50, and -30, respectively), distilled water (100 mL), and 35%-37% HCl (120 μL) solution, were prepared by stirring the solution on a hot plate at 100° C. The resulting nanocomposites (as-prepared $NbO_x$/GO) were dried at 100° C. overnight and the resulting powder was collected. Finally, the powder samples were heat-treated in an Ar atmosphere at 600° C. for 2 h to obtain carbon coated and graphene supported $Nb_2O_5$ nanocomposites. Control samples (carbon-coated $Nb_2O_5$ NPs without reduced graphene oxide) were prepared by the same synthesis procedure mentioned above, but without the addition of GO.

By varying the anode material type and cathode material type, six types of cells were made, having either pre-sodiated $V_2O_5$ or pre-sodiated $Nb_2O_5$ particles as the anode active material and 1 M of $LiPF_6$ in EC-PC (50/50) as the electrolyte. For each anode type, one cell contains RGO sheets (no functionalized porphyrin) as the cathode active material. A second cell contains functionalized porphyrin as the cathode active material. A third cell contains the functionalized porphyrin/RGO hybrid nanosheets as the cathode active material. The conventional slurry coating and drying process was followed to make the cathode electrode. For instance, for the first cell, RGO sheets were mixed with NMP to form a slurry, which was then coated onto both primary surfaces of a sheet of Al foil (serving as a current collector). The cathode contains RGO sheets (88% by wt.), 5% acetylene black as a conductive additive, and 7% PVDF binder resin. The anode (containing electrochemically pre-sodiated $V_2O_5$ or pre-sodiated $Nb_2O_5$ nanoparticles) was also made in a similar manner. An anode and a cathode are spaced by a porous separator to form an electrochemical cell.

Example 2: Preparation of Single-Layer Graphene Sheets from Mesocarbon Micro-Beads Mesocarbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets, in combinations with several different porphyrin compounds, were then made into pseudocapacitor cathodes. Each pseudocapacitor cathode was then paired with a sodiated particle-based anode active material layer and a separator/electrolyte to form a cell. Several types of cells, containing different anode and cathode material, were made and tested.

Example 3: Preparation of Pristine Graphene (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene supercapacitor having a higher electrical conductivity and lower equivalent series resistance. Pristine graphene sheets were produced by using the direct ultrasonication process (also called the liquid-phase exfoliation process).

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are essentially no other non-carbon elements. The pristine graphene sheets were then bonded with several different porphyrin compounds to form different pseudocapacitance cathodes.

Example 4: Preparation of Graphene Oxide (GO) Suspension from Natural Graphite and of Subsequent CO-Supported Porphyrin Electrodes Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions using ultrasonication. Some of these GO sheets were then dispersed in a liquid medium, along with a desired type of porphyrin material. The resulting suspension containing porphyrin was then spray-dried to form isolated porphyrin-bonded graphene nanosheets.

Example 5: Preparation of Graphene Fluoride (GF)

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication lengths of time ensured better stability. During the sonication procedure, porphyrin was added for the preparation of the pseudocapacitance cathodes.

Example 6: Preparation of Nitrogenataed Graphene/Porphyrin-Based Pseudocapacitor Cathodes Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1:0.5, 1:1 and 1:2, respectively and the nitrogen contents of these samples were 14.7, 18.2 and 17.5 wt %, respectively as determined by elemental analysis. These nitrogenataed graphene sheets remain dispersible in water.

As an example of a porphyrin compound to pair up with nitrogenated graphene, the polyporphyrin (TThPP) linked by 4-thiophenephenyl groups was synthesized through an in situ chemical oxidative polymerization on the surface of nitrogenated graphene sheets. The procedure began with synthesis of 4-(Thiophen-2-yl)benzaldehyde, which was based on the following sequence. As an example, to a solution of 4-bromobenzaldehyde (370 mg, 2.0 mmol) in dry THF (15 mL) was added the catalyst Pd(PPh3)4 (115 mg, 0.1 mmol) at room temperature under nitrogen. After the mixture was stirred at room temperature for 0.5 h, thiophen-2-ylboronic acid (384 mg, 1.5 mmol) and 2 N aqueous $K_2CO_3$ (2 mL, 4 mmol) were added into the reaction solution which was continually stirred for 0.5 h at room temperature. Then, the reaction mixture was refluxed overnight. After the reaction, the solution was cooled down to room temperature, and the solvent was removed. The residue was purified by silica gel column chromatography eluting with $CH_2Cl_2$/hexane (1:2) to give 4-(thiophen-2-yl) benzaldehyde (310 mg, 82%) as a yellow solid.

The synthesis of meso-tetrakis(4-thiophenephenyl)porphyrin (TThP) bonded on graphene surfaces were then conducted as follows: Into a 1000 mL three-necked flask, 4-(thiophen-2-yl)-benzaldehyde (940 mg, 5 mmol), pyrrole (356 mg, 5 mmol) and 500 mL of $CHCl_3$ were added. After they were pumped with nitrogen for 15 min, 1.62 mmol of boron trifluoride diethyl etherate (BFEE, 0.207 mL) was added into the solution. Then the mixture was stirred at room temperature under nitrogen atmosphere. The reaction was monitored by thin-layer chromatography (TLC). When the 4-(thiophen-2-yl)benzaldehyde was consumed, 3.75 mmol of 2,3-dichloro-5,6-dicyanol, 4-benzoquinone (DDQ, 0.851 g) and a desired amount of nitrogenated graphene sheets were added, and the mixture was allowed to stir for another 1 h. This amount of graphene sheets was varied to achieve a range of porphyrin/graphene ratios. Subsequently, the reaction was quenched by addition of 0.5 mL of triethylamine for 10 min. After evaporation of the solvent, the crude product was purified by column chromatography on silica gel using petroleum ether/$CH_2Cl_2$ (4:1) as the eluent. Then the product was filtered and washed with methanol until the filtrate became colorless to give meso-tetrakis(4-thiophenephenyl)porphyrin (TThP) as a purple solid bonded on graphene surfaces. TThP is an example of porphyrin-based polymers.

Example 7: Preparation of Porphyrin Ni-Bonded Graphene Sheets

A porphyrin containing Ni at its center, dimesityl-substituted norcorrole nickel(II) complex (NiNC), was synthesized according to the procedure described in Hiroshi Shinokubo. Angew. Chem., (2013), 125: 1400. doi: 10.1002/ange.201207020. However, before the final reaction was allowed to proceed, a desired amount of graphene sheets was added into the reactor.

Pouch cells using NiNC-bonded graphene sheets as a cathode active material (90% NiNC-bonded graphene nanosheets and 10% PVDF as a resin binder) and pre-sodiated MXene anode were made and tested. In all cells, the separator used was one sheet of micro-porous membrane (Celgard 2500). The current collector for the cathode was a piece of carbon-coated aluminum foil and that for the anode was Cu foil. The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

Example 8: MXene/Graphene Composite Paper as an Anode $Ti_3AlC_2$ with a particle size <38 µm were treated according to the following procedure: Multilayered $Ti_3C_2T_x$ were synthesized by etching 3 g of $Ti_3AlC_2$ powders in a mixture of lithium fluoride, LiF, and 9 M hydrochloric acid, HCl, for 24 h at 35° C. The etched $Ti_3C_2T_x$ powder was washed with deionized water and then centrifuged until the pH of the supernatant was above 5 and then vacuum-filtered. In order to delaminate or exfoliate $Ti_3C_2T_x$, 1 g of the multilayered $Ti_3C_2T_x$ powder was added in 250 mL deionized water and sonicated for 1 h under Ar flow. After centrifugation for 1 h at 3500 rpm, the dark green supernatant was collected, confirming the delamination of $Ti_3C_2T_x$. The concentration of the delaminated $Ti_3C_2T_x$ was determined by filtering a known volume of the delaminated $Ti_3C_2T_x$ suspension through a Celgard membrane and measuring the weight of the film after vacuum-drying.

To prepare cetyltrimethylammonium bromide (CTAB)-grafted graphene sheets, CTAB (>99%, SigmaAldrich) was dissolved in deionized water (0.1 wt. %) and then GO-water solution was poured into the CTAB solution. The mixture suspension was well-dispersed by probe sonication to obtain a GO concentration of 0.5 mg/mL. Porous $Ti_3C_2T_x$/GO composite films were prepared by a self-assembly process. Typically, 3.1 mL of the CTAB-grafted GO solution was added dropwise to $Ti_3C_2T_x$ suspension (0.4 mg mL-1, 35 mL). The mixture was probe-sonicated for 10 min and then filtered using a Celgard membrane. Porous self-assembled $Ti_3C_2T_x$/GOs (denoted as $Ti_3C_2T_x$/GO-SA) composite film was obtained after washing with copious deionized water and vacuum drying. $Ti_3C_2T_x$/GO-SDS film was prepared in a similar manner but sodium dodecylsulphate, instead of CTAB, was used to modify GOs. Pure $Ti_3C_2T_x$ film was prepared by vacuum-filtrating 35 mL of $Ti_3C_2T_x$ suspension (0.4 mg mL-1).

Example 9: Graphene-Supported $Na_2Ti_3O_7$ Nanosheets as the Anode of an Internal Hybrid Cell The graphene-supported $TiO_2$ nanosheets were prepared by a sol-gel method using tetrabutyl orthotitanate (TBOT) as the titanium precursor and benzyl alcohol (BA) as a surfactant. In a typical procedure, reduced graphene oxide (RGO) sheets (50 mg) were dispersed in 20 mL anhydrous ethanol by sonication for 10 minutes, followed by addition of BA (4 mL) and distilled water (1 mL) and the mixture was stirred in an ice bath. TBOT (1 mL) was dissolved in 10 mL anhydrous ethanol and slowly dropped into the above suspension. After stirring for 4 h, the precipitates were collected by vacuum filtration, washed with anhydrous ethanol and then dried at 60° C. overnight. Subsequently, graphene-supported $TiO_2$ (0.2 g) was stirred in a 30 mL of 5 M NaOH solution for 1 h. Then the suspension was transferred into a 50 mL Teflon-lined stainless-steel autoclave and kept at 150° C. for 10 h before being allowed to naturally cool down to room temperature. The precipitate was collected by centrifugation, washed with distilled water until the pH value of 8 was accurately achieved. After being dried at 60° C. overnight, the as-synthesized samples were calcinated at 500° C.

for 5 h in argon atmosphere to obtain graphene-supported Na$_2$Ti$_3$O$_7$ nanosheets. The unsupported Na$_2$Ti$_3$O$_7$ was synthesized under similar conditions except for the absence of RGO sheets in the reaction system.

Example 10: Details About Evaluation of Various Internal Hybrid Electrochemical Cells In a conventional cell, an electrode (cathode or anode), is typically composed of 85% of an electrode active material (e.g. graphene, activated carbon, or inorganic nanodiscs, etc.), 5% Super-P (acetylene black-based conductive additive), and 10% PTFE, which were mixed and coated on Al foil. The thickness of electrode is around 100 μm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q = I*t/m \quad (1)$$

where I is the constant current in mA, t is the time in hours, and m is the cathode active material mass in grams. With voltage V, the specific energy (E) is calculated as, $$E = \int V dq \quad (2)$$

The specific power (P) can be calculated as $$P = (E/t)(W/kg) \quad (3)$$

where t is the total charge or discharge step time in hours. The specific capacitance (C) of the cell is represented by the slope at each point of the voltage vs. specific capacity plot, $$C = dq/dV \quad (4)$$

For each sample, several current density (representing charge/discharge rates) were imposed to determine the electrochemical responses, allowing for calculations of energy density and power density values required of the construction of a Ragone plot (power density vs. energy density).

Figure 4:
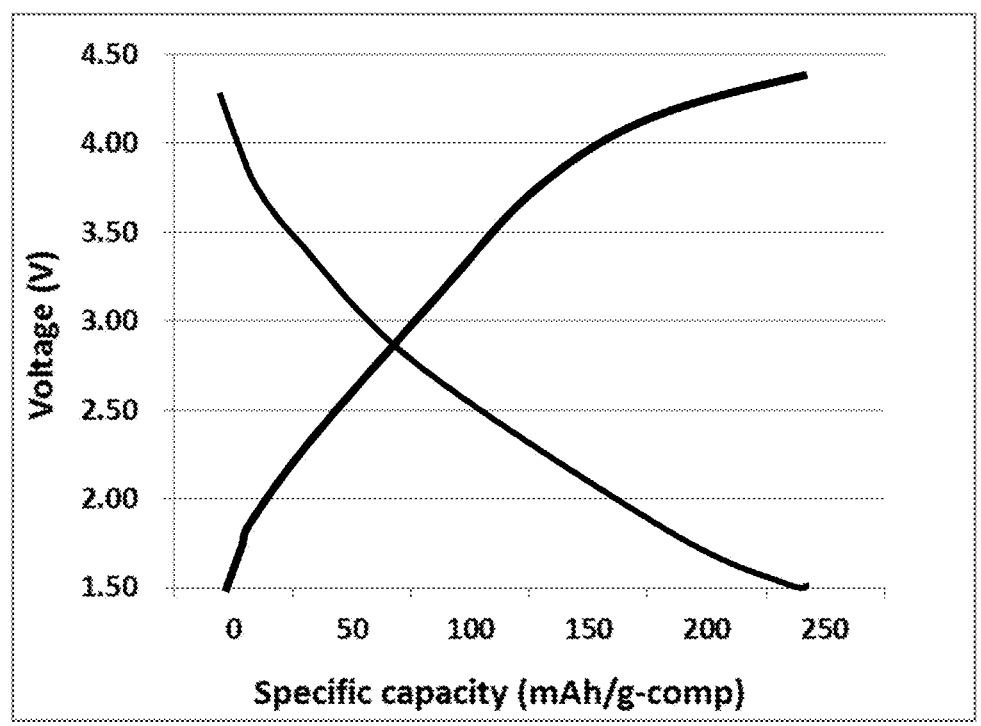
FIG. 4 Some representative charge-discharge curve of an internal hybrid cell, featuring a pre-sodiated $Nb_2O_5$ anode and a pseudocapacitance cathode containing porphyrin copper-bonded graphene sheets.

FIG. 4 shows some representative charge-discharge curve of an internal hybrid cell, featuring a pre-sodiated Nb$_2$O$_5$ anode and a pseudocapacitance cathode containing CuDEPP-bonded graphene sheets (prepared in Example 1). The shapes of these curves are characteristic of pseudocapacitance behaviors, rather than electric double layer capacitance (EDLC) or lithium ion-intercalation type battery behavior. The corresponding cyclic voltammetry diagrams further confirm the same behaviors. It may be noted that, in contrast to the conventional lithium-ion capacitor, the instant internal hybrid cell does not have to be limited to an operating voltage from 1.5V to 4.5 V.

Figure 5:
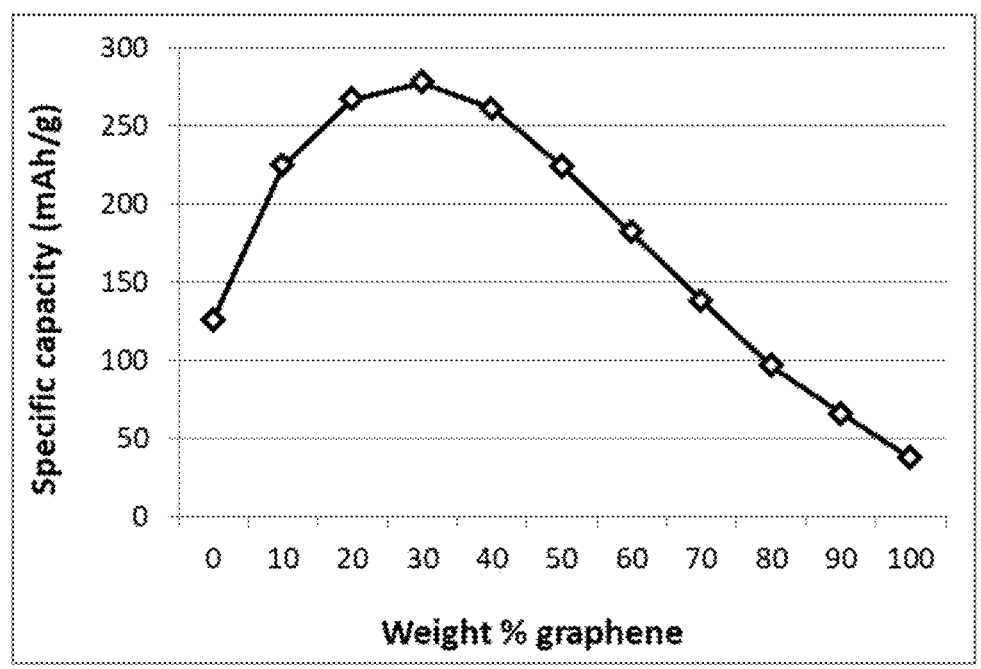
FIG. 5 The charge storage capacity values (based on the cathode active material weight) of a series of internal hybrid cells each featuring a pre-sodiated $Nb_2O_5$ anode and a pseudocapacitance cathode containing porphyrin copper-bonded graphene sheets, and those of the cells containing, in the cathode, porphyrin copper only or graphene sheets only as the cathode active material.

Shown in FIG. 5 are the charge storage capacity values (based on the total cathode active material weight) of a series of internal hybrid cells each featuring a pre-sodiated Nb$_2$O$_5$ anode and a pseudocapacitance cathode containing CuDEPP/bonded graphene sheets, and those of the cells containing, in the cathode, CuDEPP only or graphene sheets only as the cathode active material. These data have clearly exhibited surprising synergistic effects between a porphyrin molecule and a graphene sheet. When implemented alone as a cathode active material, either CuDEPP or graphene sheets provide very minimal charge storage capability. When combined to form a redox pair, the two species work together to provide exceptionally high charge storage capacity, up to 278 mAh/g (the sum of CuDEPP weight and graphene weight) between 1.5 V and 4.3 V.

Figure 6:
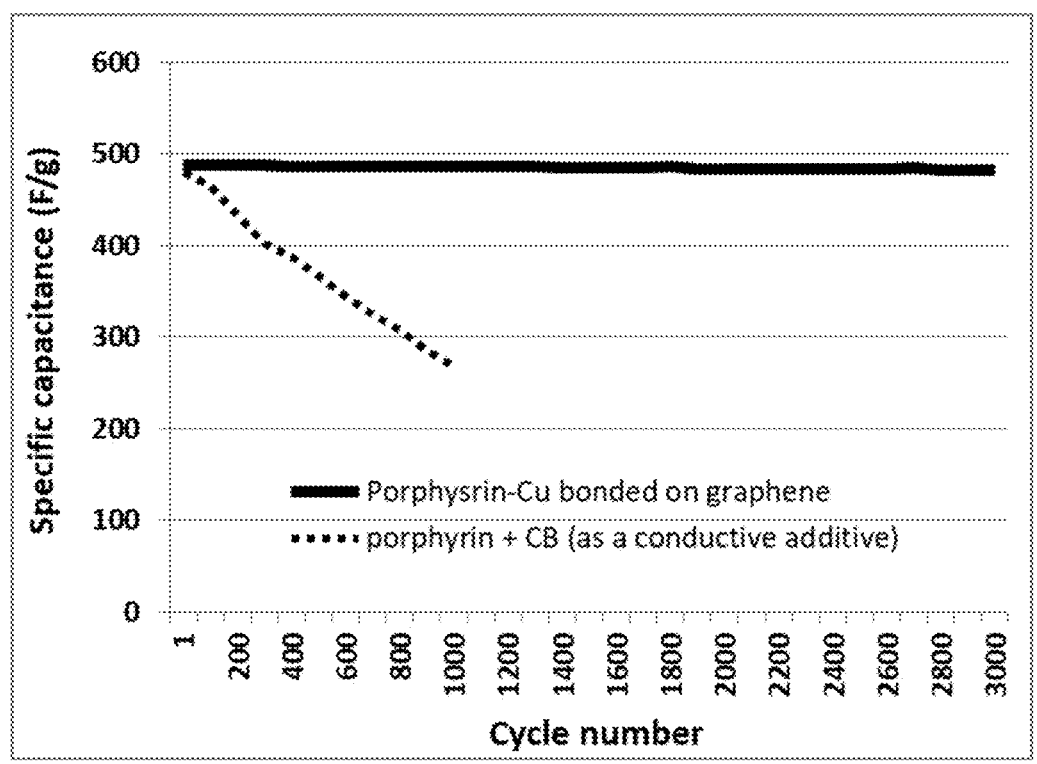
FIG. 6 The charge-discharge cycling curves of two cells: one being an internal hybrid cell, featuring a pre-sodiated $Nb_2O_5$ anode and a pseudocapacitance cathode containing porphyrin copper-bonded graphene sheets and the other featuring a porphyrin copper as a cathode active material (+carbon black as a conductive additive; porphyrin not bonded on CB particles).

The charge-discharge cycling data of a representative internal hybrid cell are summarized in FIG. 6, which indicates that the internal cell exhibits not only a high specific capacity but also a stable cycling behavior. The cell suffers a capacitance loss of less than 1.23% after 3,000 cycles, which is outstanding compared to conventional pseudocapacitors or lithium-ion batteries. If CuDEPP alone (no graphene) is used as the cathode active material and carbon black (CB) is used as a conductive additive in the cathode (CuDEPP not bonded to or supported by CB), the cell suffers from a rapid capacity decay. It is quite possible that graphene sheets helps prevent porphyrin from getting dissolved in the liquid electrolyte of the cell.

Figure 7:
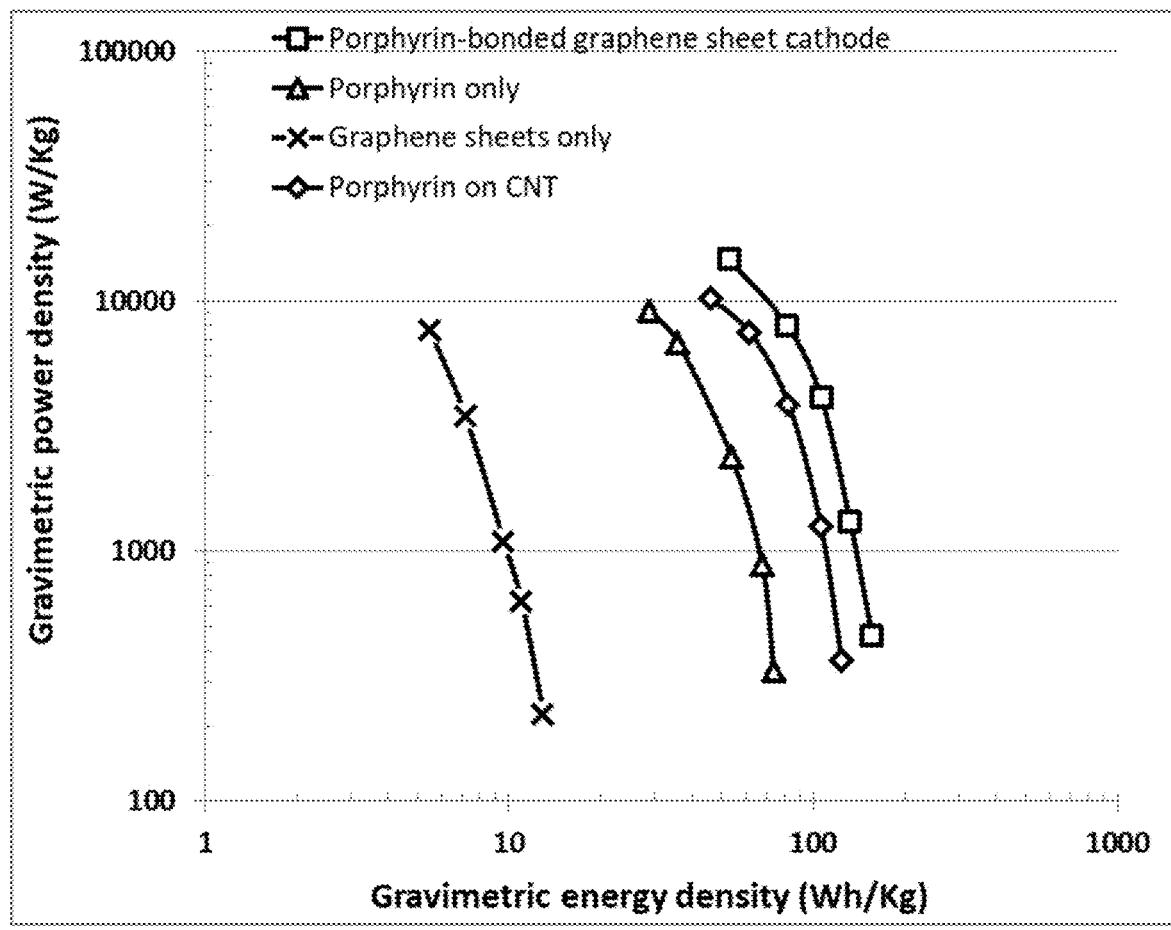
FIG. 7 Ragone plot of four types of electrochemical cells each having pre-sodiated MXene as the anode active material: a cell using graphene as a cathode active material, a cell using a porphyrin-Ni as the cathode active material, porphyrin-Ni-bonded CNTs as a cathode active material, and porphyrin-Ni-bonded graphene sheets as a cathode active material.

FIG. 7 shows the Ragone plots of four types of electrochemical cells each having a pre-sodiated MXene as the anode active material: (i) a cell using graphene as a cathode active material, (ii) a cell using porphyrin-Ni (+10% carbon black as a conductive additive) as the cathode active material, (iii) porphyrin-Ni-bonded CNTs as a cathode active material, and (iv) an internal hybrid cell using porphyrin-Ni-bonded graphene sheets as a cathode active material (90% porphyrin-Ni-bonded graphene nanosheets and 10% PVDF as a resin binder). These results again have demonstrated an unexpected synergistic effect between porphyrin-Ni and graphene sheets when the pair of porphyrin/graphene materials is implemented as a pseudocapacitance cathode. Other carbon materials (e.g. CNT, activated carbon, etc.) may also be used to support porphyrin as a cathode active material in a sodium ion-based internal hybrid cell.

Quite significantly, the energy density of the presently invented Na ion-based internal hybrid cell is as high as 156 Wh/kg, which is comparable to those of lithium-ion batteries and higher than those (100-150 Wh/kg) of conventional sodium-ion batteries. A maximum power density of 14.65 kW/kg is dramatically higher than those (typically <0.5 kW/kg) of lithium-ion batteries and even higher than those of supercapacitors (3-8 W/kg). These results have demonstrated that the presently invented internal hybrid electrochemical cells have the best characteristics of both lithium-ion or sodium-ion batteries and supercapacitors.

Figure 8:
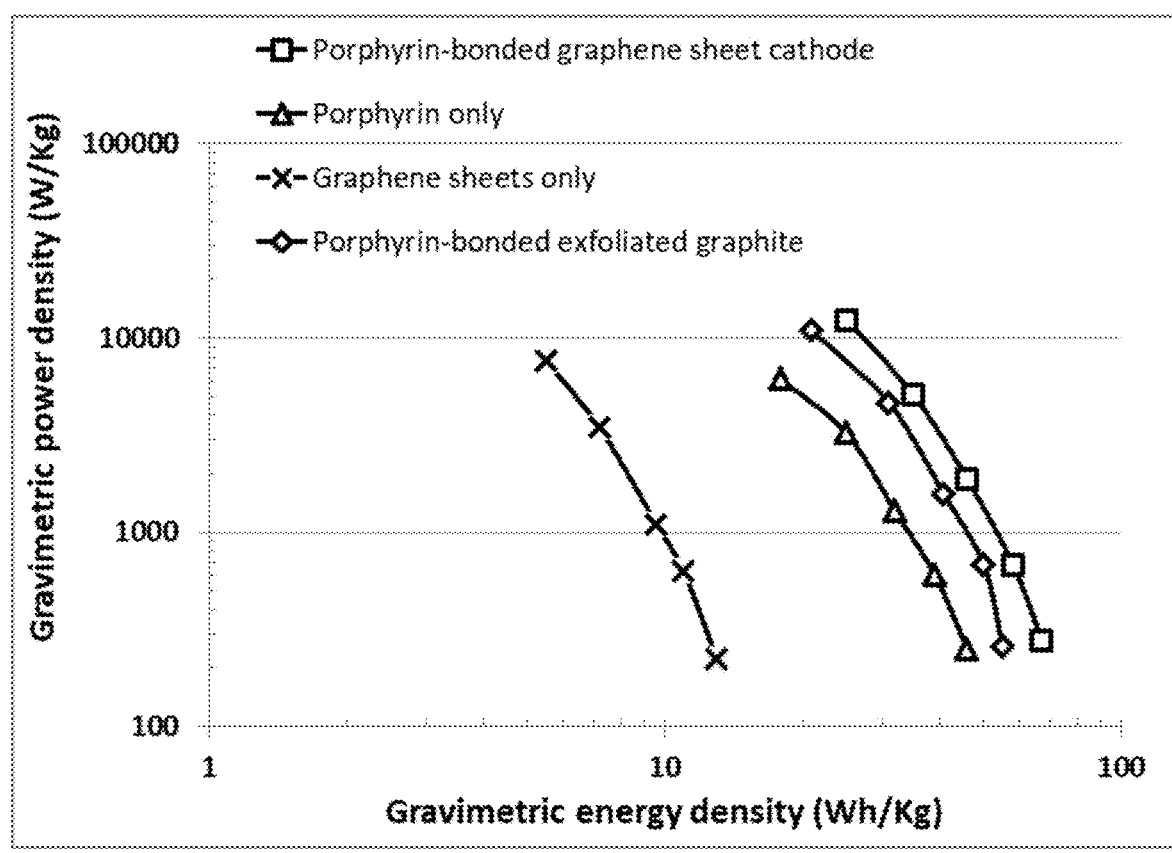
FIG. 8 Ragone plots of four types of electrochemical cells, each having graphene-supported $Na_2Ti_3O_7$ nanosheets as the anode active material: (i) a cell using graphene as a cathode active material, (ii) a cell using a functionalized porphyrin-Fe as the cathode active material, (iii) an internal hybrid cell using functionalized porphyrin-Fe bonded exfoliated graphite as a cathode active material, and (iv) an internal hybrid cell using functionalized porphyrin-Fe-bonded graphene sheets as a cathode active material.

Shown in FIG. 8 are the Ragone plots of four types of electrochemical cells each having a graphene-supported Na$_2$Ti$_3$O$_7$ nanosheets as the anode active material: (i) a cell using graphene as a cathode active material, (ii) a cell using a functionalized porphyrin-Fe as the cathode active material, (iii) an internal hybrid cell using functionalized porphyrin-Fe bonded exfoliated graphite as a cathode active material and (iv) an internal hybrid cell using functionalized porphyrin-Fe bonded graphene sheets as a cathode active material. These results again have demonstrated an unexpected synergistic effect between a functionalized porphyrin and graphene sheets when this pair of porphyrin/graphene is implemented as a pseudocapacitance cathode. Exfoliated graphite also helps the cell deliver good electrochemical behaviors, although not nearly as good as graphene. These results have again demonstrated that the presently invented internal hybrid electrochemical cells can deliver both high energy density and high power density that are superior to those of conventional EDLC supercapacitors or pseudocapacitors.

We claim:
1. An internal hybrid electrochemical cell comprising:
(A) a cathode comprising a cathode active material that contains both graphene sheets and a porphyrin com- pound, wherein said porphyrin compound is bonded to or supported by primary surfaces of said graphene sheets to form a redox pair for pseudocapacitance;

(B) an anode comprising an anode active material selected from sodium metal, a sodium metal alloy, a sodium intercalation compound, a sodium-containing compound, or a combination thereof; and (C) a sodium-containing electrolyte in physical contact with the anode and the cathode; wherein said cathode active material has a specific surface area no less than 100 m²/g which is in direct physical contact with said electrolyte.

2. An internal hybrid electrochemical cell comprising:

a) a cathode comprising a cathode active material that contains a porphyrin compound and a carbon material, wherein said porphyrin compound is bonded to or supported by a surface of said carbon material to form a redox pair for pseudocapacitance and said carbon material is selected from activated carbon, activated carbon black, expanded graphite flakes, exfoliated graphite worms, carbon nanotube, carbon nanofiber, carbon fiber, a combination thereof, or a combination thereof with graphene;

b) an anode comprising an anode active material selected from sodium metal, a sodium metal alloy, a sodium intercalation compound, a sodium-containing compound, or a combination thereof; and c) a sodium-containing electrolyte in physical contact with the anode and the cathode; wherein said cathode active material has a specific surface area no less than 100 m²/g which is in direct physical contact with said electrolyte.

3. The internal hybrid electrochemical cell of claim 1, wherein said activated carbon is selected from chemically etched or expanded soft carbon, chemically etched or expanded hard carbon, exfoliated activated carbon, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nanofiber, activated carbon fiber, activated graphite fiber, activated carbonized polymer fiber, activated coke, activated pitch, activated asphalt, activated mesophase carbon, activated mesoporous carbon, activated electrospun conductive nanofiber, or a combination thereof.

4. The internal hybrid electrochemical cell of claim 1 or claim 2, wherein said sodium intercalation compound is selected from pre-sodiated coke, pre-sodiated carbon black, pre-sodiated amorphous carbon, pre-sodiated activated carbon, pre-sodiated hard carbon, pre-sodiated soft carbon, pre-sodiated hollow carbon nanowires, pre-sodiated hollow carbon sphere, pre-sodiated carbon nanotubes, pre-sodiated carbon fibers, pre-sodiated expanded graphite, pre-sodiated graphene, sodium titanates, pre-sodiated $V_2O_5$, pre-sodiated $Nb_2O_5$, pre-sodiated $NiCo_2O_4$, $Na_3V_2(PO_4)_3$, $NaTi_2(PO_4)_3$, $Na_2Ti_3O_7$, $Na_2C_8H_4O_4$, $Na_2TP$, $Na_xTiO_2$ (x=0.2 to 1.0), $Na_2Fe_2(SO_4)_3$, $Na_2C_8H_4O_4$, carboxylate based materials, $C_8H_4Na_2O_4$, pre-sodiated $C_8H_6O_4$, $C_8H_5NaO_4$, $C_8Na_2F_4O_4$, $C_{10}H_2Na_4O_8$, pre-sodiated $C_{14}H_4O_6$, $C_{14}H_4Na_4O_8$, a pre-sodiated member of MXenes, or a combination thereof.

5. The internal hybrid electrochemical cell of claim 1 or claim 2, wherein said sodium intercalation compound or sodium-containing compound is selected from the group consisting of:

A) sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;

B) sodium-containing alloys or intermetallic compounds of Si, Ge, Sn, Pb, Sb, Bi, Zn, Al, Ti, Co, Ni, Mn, Cd, and their mixtures;

C) sodium-containing oxides, carbides, nitrides, sulfides, phosphides, selenides, tellurides, or antimonides of Si, Ge, Sn, Pb, Sb, Bi, Zn, Al, V, Fe, Ti, Co, Ni, Mn, Cd, and mixtures or composites thereof; and D) combinations thereof and combinations thereof with a pre-sodiated carbon or graphite material.

6. The internal hybrid electrochemical cell of claim 1 or claim 2, wherein said porphyrin compound is selected from porphyrin, porphyrin-copper, porphyrin-zinc, porphyrin-nickel, porphyrin-cobalt, porphyrin-manganese, porphyrin-iron, porphyrin-tin, porphyrin-cadmium, porphyrin-vanadium, polyporphyrin, a functionalized porphyrin compound, or a combination thereof.

7. The internal hybrid electrochemical cell of claim 1 or claim 2, wherein said porphyrin compound is selected from a porphyrin-transition metal complex.

8. The internal hybrid electrochemical cell of claim 1 or claim 2, wherein said porphyrin compound contains a functionalized porphyrin compound having at least a functional group attached to a porphyrin molecule, wherein said functional group is selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from a phenol group, R'—OH, R'—NR'$_2$, R'SH, R'CHO, R'CN, R'X, R'N⁺(R')$_3$X⁻, R'SiR'$_3$, R'Si(—OR'—)$_y$R'$_{3-y}$, R'Si(—O—SiR'$_2$—) OR', R'—R'', R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

9. The internal hybrid electrochemical cell of claim 1 or claim 2, wherein said porphyrin compound contains a functionalized porphyrin compound having at least a functional group attached to a porphyrin molecule, wherein said functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

10. The internal hybrid electrochemical cell of claim 1 or claim 2, wherein said porphyrin compound contains a functionalized porphyrin compound having at least a functional group attached to a porphyrin molecule, wherein said functional group contains an azide or bi-radical compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

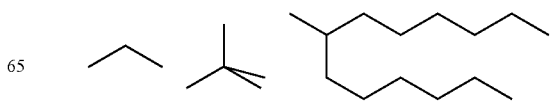

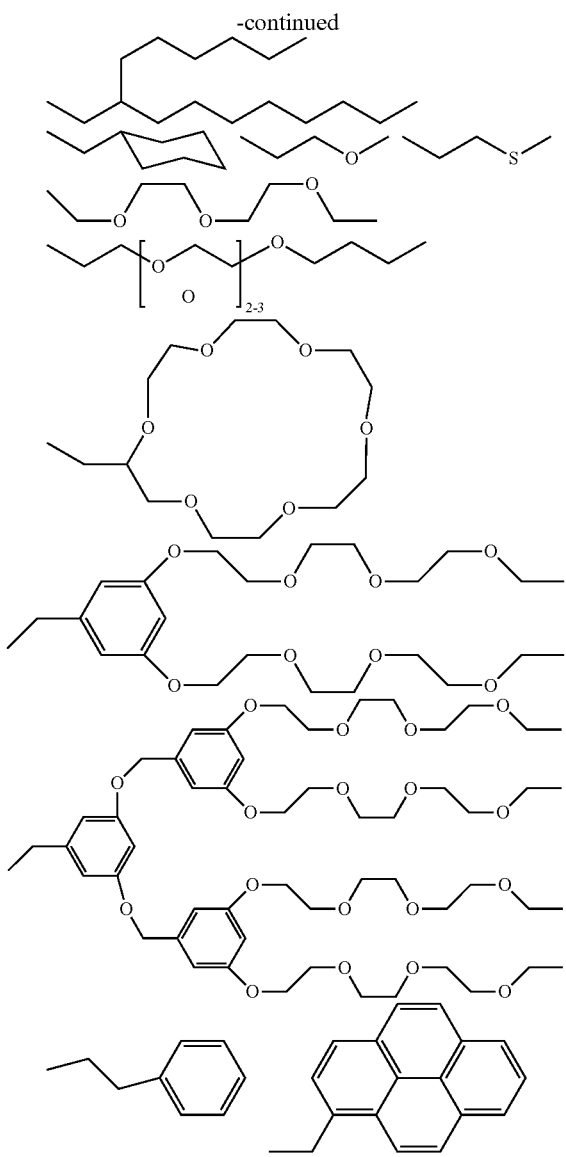

and combinations thereof.

11. The internal hybrid electrochemical cell of claim 1, wherein said graphene sheets comprise single-layer or few-layer graphene, containing up to 10 graphene planes, selected from pristine graphene, graphene oxide, reduced graphene oxide, halogenated graphene, hydrogenated graphene, nitrogenated graphene, doped graphene, chemically functionalized graphene, or a combination thereof.

12. The internal hybrid electrochemical cell of claim 1 or claim 2, wherein said cathode active material has a specific surface area no less than 200 m$^2$/g which is in direct physical contact with said electrolyte and said graphene sheets contain single-layer graphene.

13. The internal hybrid electrochemical cell of claim 1 or claim 2, wherein said cathode active material has a specific surface area no less than 500 m$^2$/g which is in direct physical contact with said electrolyte and said graphene sheets contain single-layer graphene.

14. The internal hybrid electrochemical cell of claim 1, wherein said porphyrin complex is bonded to a primary surface of a graphene sheet.

15. The internal hybrid electrochemical cell of claim 1 or claim 2, wherein said sodium metal or sodium metal alloy is in a form of metal foil, film, particles, chips, or filaments and wherein said metal alloy contains no less than 80% by weight of sodium.

16. The internal hybrid electrochemical cell of claim 1 or claim 2, wherein said cathode further contains a resin binder that bonds graphene sheets or said carbon material together.

17. The internal hybrid electrochemical cell of claim 1, wherein said cathode further contains a conductive filler selected from graphite or carbon particles, carbon black, expanded graphite, graphene, carbon nanotube, carbon nanofiber, carbon fiber, conductive polymer, or a combination thereof.

18. The internal hybrid electrochemical cell of claim 1 or claim 2, wherein at least one of the anode and the cathode contains a current collector that is a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerogel, graphene foam, graphene oxide foam, reduced graphene oxide foam, carbon fiber paper, graphene paper, graphene oxide paper, reduced graphene oxide paper, carbon nanofiber paper, carbon nanotube paper, or a combination thereof.

19. The internal hybrid electrochemical cell of claim 1 or claim 2, wherein said anode active material contains pre-sodiated particles of an anode active material and said pre-sodiated particles reside in pores of a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerogel, graphene foam, graphene oxide foam, reduced graphene oxide foam, carbon fiber paper, graphene paper, graphene oxide paper, reduced graphene oxide paper, carbon nanofiber paper, carbon nanotube paper, or a combination thereof.

20. The internal hybrid electrochemical cell of claim 1 or claim 2, wherein the electrolyte is organic liquid electrolyte, ionic liquid electrolyte, or gel electrolyte containing an amount of sodium ions when said cell is made.

21. The internal hybrid electrochemical cell of claim 1 or claim 2, wherein said electrolyte is selected from an aqueous electrolyte, organic electrolyte, ionic liquid electrolyte, a mixture of an organic electrolyte and an ionic electrolyte, or a mixture thereof with a polymer.

22. The internal hybrid electrochemical cell of claim 21, wherein said aqueous electrolyte contains a sodium salt dissolved in water or a mixture of water and alcohol.

23. The internal hybrid electrochemical cell of claim 22, wherein said sodium salt is selected from $Na_2SO_4$, $Na_2Co_3$, NaOH, NaCl, NaF, NaBr, NaI, or a mixture thereof.

24. The internal hybrid electrochemical cell of claim 21, wherein said organic electrolyte contains a liquid organic solvent selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

25. The internal hybrid electrochemical cell of claim 21, wherein said organic electrolyte contains a sodium salt selected from sodium perchlorate (NaClO$_4$), sodium hexafluorophosphate (NaPF$_6$), sodium borofluoride (NaBF$_4$), sodium hexafluoroarsenide, sodium trifluorometasulfonate (NaCF$_3$SO$_3$), bis-trifluoromethyl sulfonylimide sodium (NaN(CF$_3$SO$_2$)$_2$), sodium trifluoromethanesulfonimide (NaTFSI), or a combination thereof.

26. The internal hybrid electrochemical cell of claim 21, wherein said ionic liquid electrolyte contains an ionic liquid solvent selected from a room temperature ionic liquid having a cation selected from tetra-alkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

27. The internal hybrid electrochemical cell of claim 26, wherein said ionic liquid solvent is selected from a room temperature ionic liquid having an anion selected from BF$_4^-$, B(CN)$_4^-$, CH$_3$BF$_3^-$, CH$_2$CHBF$_3^-$, CF$_3$BF$_3^-$, C$_2$F$_5$BF$_3^-$, n-C$_3$F$_7$BF$_3^-$, n-C$_4$F$_9$BF$_3^-$, PF$_6^-$, CF$_3$CO$_2^-$, CF$_3$SO$_3^-$, N(SO$_2$CF$_3$)$_2^-$, N(COCF$_3$)(SO$_2$CF$_3$)$^-$, N(SO$_2$F)$_2^-$, N(CN)$_2^-$, C(CN)$_3^-$, SCN$^-$, SeCN$^-$, CuCl$_2^-$, AlCl$_4^-$, F(HF)$_{2.3}^-$, or a combination thereof.

28. An energy storage device comprising at least two internal hybrid electrochemical cells of claim 1 that are connected in series or in parallel.

29. An energy device comprising at least one internal hybrid electrochemical cell of claim 1, which is electrically connected to an electrochemical cell in series or in parallel.

30. An energy storage device comprising at least two internal hybrid electrochemical cells of claim 2 that are connected in series or in parallel.

31. An energy device comprising at least one internal hybrid electrochemical cell of claim 2, which is electrically connected to an electrochemical cell in series or in parallel.

* * * * *